US011267568B2

(12) United States Patent
Sun et al.

(10) Patent No.: US 11,267,568 B2
(45) Date of Patent: Mar. 8, 2022

(54) AERIAL SYSTEM INCLUDING FOLDABLE FRAME ARCHITECTURE

(71) Applicant: Hangzhou Zero Zero Technology Co., Ltd., Zhejiang (CN)

(72) Inventors: Wei Sun, Zhejiang (CN); Zheng Qu, Zhejiang (CN); Tong Zhang, Zhejiang (CN)

(73) Assignee: HANGZHOU ZERO ZERO TECHNOLOGY CO., LTD., Zhejiang (CN)

( * ) Notice: Subject to any disclaimer, the term of this patent is extended or adjusted under 35 U.S.C. 154(b) by 739 days.

(21) Appl. No.: 16/156,125

(22) Filed: Oct. 10, 2018

(65) Prior Publication Data

US 2019/0106209 A1 Apr. 11, 2019

Related U.S. Application Data

(60) Provisional application No. 62/570,935, filed on Oct. 11, 2017.

(51) Int. Cl.
*B64C 27/52* (2006.01)
*B64C 39/02* (2006.01)
*B64C 27/20* (2006.01)

(52) U.S. Cl.
CPC .............. *B64C 27/52* (2013.01); *B64C 27/20* (2013.01); *B64C 39/024* (2013.01);
(Continued)

(58) Field of Classification Search
CPC ..... B64C 27/52; B64C 27/20; B64C 29/0033; B64C 2201/027; B64C 2201/042; B64C 2201/108; B64C 2201/162
See application file for complete search history.

(56) References Cited

U.S. PATENT DOCUMENTS

| | | | | |
|---|---|---|---|---|
| 3,184,183 A | * | 5/1965 | Plasecki | B64C 27/20 244/23 R |
| 4,537,372 A | * | 8/1985 | Forizs | B64C 29/0033 244/12.4 |

(Continued)

FOREIGN PATENT DOCUMENTS

CN 103332293 A 10/2013

OTHER PUBLICATIONS

International Preliminary Report on Patentability (International Application No. PCT/IB2018/057860); dated Apr. 23, 2020; 6 pages.

*Primary Examiner* — Philip J Bonzell

(57) ABSTRACT

A frame assembly for an aerial system including a fuselage body and first and second rotor assemblies is described herein. The first and second rotor assemblies are coupled to the fuselage body by respective positioning assemblies. Each positioning assembly including a hinge assembly to enable the first and second rotor assemblies to pivot between a deployed position and a stowed position. A first positioning assembly including tapered positioning shaft. A second positioning assembly including a positioning sleeve having a tapered inner surface defining a cavity that is configure to receive the positioning shaft therein. The first positioning assembly being coupled to the second positioning assembly such that the first positioning assembly is rotatable about the rotor assembly rotational axis independent of the second rotor assembly.

17 Claims, 24 Drawing Sheets

(52) U.S. Cl.
CPC .. *B64C 2201/027* (2013.01); *B64C 2201/042* (2013.01); *B64C 2201/108* (2013.01)

(56) References Cited

U.S. PATENT DOCUMENTS

| | | | | |
|---|---|---|---|---|
| 7,249,732 | B2 * | 7/2007 | Sanders, Jr | B64C 27/12 |
| | | | | 244/12.1 |
| 8,827,200 | B2 * | 9/2014 | Radu | B60F 5/02 |
| | | | | 244/2 |
| 8,991,740 | B2 * | 3/2015 | Olm | B60F 5/02 |
| | | | | 244/2 |
| 9,045,226 | B2 * | 6/2015 | Piasecki | B64C 27/32 |
| 9,393,847 | B2 * | 7/2016 | Piasecki | B60F 5/02 |
| 9,598,171 | B2 * | 3/2017 | Olm | B64C 25/36 |
| 9,610,817 | B1 * | 4/2017 | Piasecki | B64C 39/00 |
| 9,944,389 | B2 * | 4/2018 | Piasecki | B64C 3/56 |
| 10,081,424 | B2 * | 9/2018 | Radu | B64C 29/0033 |
| 10,322,796 | B2 * | 6/2019 | Lee | B64C 39/024 |
| 10,494,092 | B2 * | 12/2019 | Piasecki | B64C 29/0033 |
| 2010/0181414 | A1 * | 7/2010 | Lopez, Jr. | B64C 29/0033 |
| | | | | 244/12.4 |
| 2013/0206915 | A1 * | 8/2013 | Desaulniers | B64C 39/028 |
| | | | | 244/165 |
| 2014/0061362 | A1 * | 3/2014 | Olm | B64C 39/005 |
| | | | | 244/2 |
| 2016/0257400 | A1 * | 9/2016 | Olm | B64C 37/00 |
| 2016/0347443 | A1 * | 12/2016 | Lee | B64C 27/08 |
| 2018/0297695 | A1 * | 10/2018 | Ramirez-Serrano | B64C 27/08 |

* cited by examiner

AERIAL SYSTEM INCLUDING FOLDABLE FRAME ARCHITECTURE

CROSS-REFERENCE TO RELATED APPLICATION

This application claims the benefit of U.S. Provisional Patent Application Ser. No. 62/570,935, filed on Oct. 11, 2017, all of which is hereby incorporated by reference in its entirety for all purposes.

TECHNICAL FIELD

This invention relates generally to the aerial system field, and more specifically, to an aerial system including a foldable frame architecture and related flight control methods.

BACKGROUND OF THE INVENTION

Fully autonomous aerial robots or drones are becoming increasingly popular and many uses. For example, recently, so-called "selfie drones" have become a popular consumer product category. The hovering ability of those selfie drones enables photo and video taking around people from totally different angles and perspectives. However, these types of consumer drones need to be efficient, safe, small and light in order to be successful.

The present invention is aimed at one or more of the problems identified above.

SUMMARY OF THE INVENTION

In a first aspect of the present invention, a frame assembly for an aerial system is provided. The aerial system may be, for example, a twin rotor drone with a propeller guard system. The frame assembly allows the aerial system to fold in a compact arrangement that is portable while offering fully protection when in flight.

In one embodiment of the present invention, a frame assembly for an aerial system is provided. The frame assembly includes a body and first and second rotor assemblies coupled to the body by a hinge assembly. The first and second rotor assemblies being movable between an open position and a closed position. The hinge assembly including a first hinge connected to the first assembly at one end of the first hinge and a second hinge connected to the second assembly at one end of the second hinge. The opposite end of the first hinge including a tapered shaft. The opposite end of the second hinge including a tapered sleeve having a tapered wall thickness. The tapered shaft being located within the tapered sleeve forming a connection assembly configured to allow the first and second rotor assemblies to rotate relative to the body.

In another embodiment of the present invention, an aerial system is provided. The aerial system includes a fuselage body and a lift assembly coupled to the fuselage body. The fuselage body includes a pair of opposing sidewalls that extend between a first endwall and an opposite second endwall along a longitudinal axis. The pair of opposing sidewalls are spaced apart a distance measured along a lateral axis that is perpendicular to the longitudinal axis. The lift assembly includes lift assembly a first rotor assembly that extends outwardly from a first sidewall of the pair of opposing sidewalls and a first positioning assembly coupled to the first rotor assembly. The first positioning assembly is configured to rotate the first rotor assembly about a rotor assembly rotational axis that is perpendicular to the longitudinal axis. The lift assembly also includes a second rotor assembly that extends outwardly from a second sidewall of the pair of opposing sidewalls and a second positioning assembly that is coupled to the second rotor assembly and to the fuselage body. The second positioning assembly is configured to rotate the second rotor assembly about the rotor assembly rotational axis. The first positioning assembly is coupled to the second positioning assembly such that the first positioning assembly is rotatable about the rotor assembly rotational axis independent of the second rotor assembly.

In a further embodiment of the present invention, a lift assembly for use with an aerial system is provided. The aerial system includes a fuselage body. The lift assembly includes a first rotor assembly extending outwardly from a first sidewall of the fuselage body and a second rotor assembly extending outwardly from an opposite second sidewall of the fuselage. A first positioning assembly is coupled to the first rotor assembly. The first positioning assembly is configured to rotate the first rotor assembly about a rotor assembly rotational axis that is perpendicular to a longitudinal axis defined along the fuselage body. A second positioning assembly is coupled to the second rotor assembly and to the fuselage body. The second positioning assembly is configured to rotate the second rotor assembly about the rotor assembly rotational axis. The first positioning assembly is coupled to the second positioning assembly such that the first positioning assembly is rotatable about the rotor assembly rotational axis independent of the second rotor assembly.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings.

Figure 1:
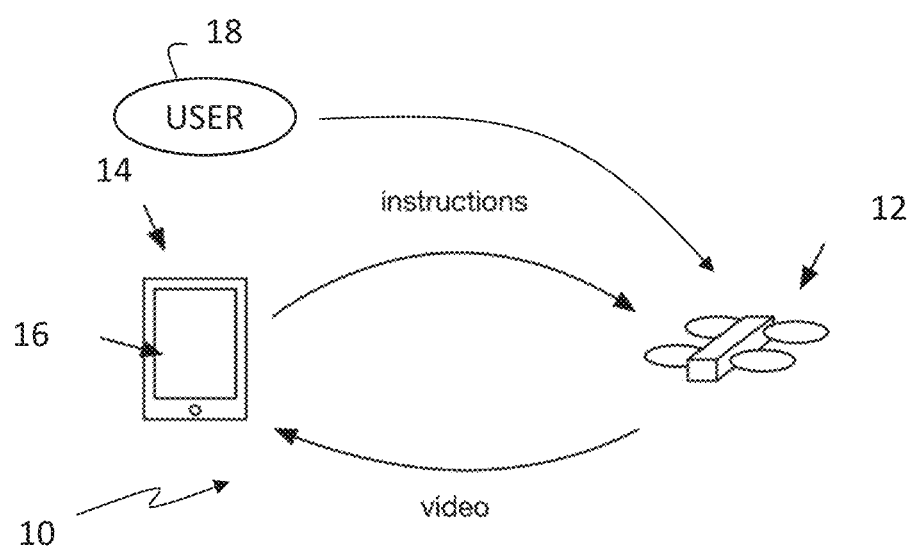
FIG. 1 is a schematic representation of an aerial system and a system for controlling the aerial system, according to an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION OF THE INVENTION

The following description of the embodiments of the invention is not intended to limit the invention to these embodiments, but rather to enable any person skilled in the art to make and use this invention. With reference to the drawings and in operation, a system 10 for controlling an aerial system 12, for example a drone or other unmanned aerial vehicle, may be provided. The system 10 may include a remote device 14 with a control client 16. The control client 16 provides a user interface that allows a user 18 to send instructions to the aerial system 12 to control operation thereof. As discussed in more depth below, the aerial system 12 may include one or more cameras for obtaining pictures and/or video which may be sent to the remote device 14 and/or stored in memory on the aerial system 12.

In one aspect of the present invention, the aerial system 12 includes a frame assembly 70. The frame assembly 70, as detailed below, allows the assembly to fold into a compact size when not in use while providing protection to the components of the system 10 and aerial system 12 during flight.

In one aspect of the present invention, the aerial system 12 may include an obstacle detection and avoidance system 50. The obstacle detection and avoidance system 50 may include a pair of cameras 52A, 52B that are utilized to provide obstacle detection and avoidance (see below). The obstacle detection and avoidance system 50 may detect a direction of travel of the aerial system 12 and may automatically adjust an orientation of the cameras 52A, 52B to align with the aerial system 12 direction of travel. Thus, the cameras 52A, 52B may automatically face the direction that the aerial system 12 is moving to improve an efficiency and accuracy of obstacle detection and avoidance in the travel path of the aerial system 12.

Overview of the System 10 and the Aerial System 12:

An exemplary aerial system 12 and control system 10 is shown in FIGS. 1-4. The control client 16 of the aerial system 12 functions to receive data from the aerial system 12, including video images and/or video, and control visual display on the remote device 14. The control client 16 may also receive operation instructions and facilitate aerial system 12 remote control based on operation instructions. The control client 16 is preferably configured to execute on a remote device 14, but can alternatively be configured to execute on the aerial system 12 or on any other suitable system. As discussed above, and more fully below, the aerial system 12 may be controlled solely without direct or physical interaction with the remote device 14.

The control client 16 can be a native application (e.g., a mobile application), a browser application, an operating system application, or be any other suitable construct.

The remote device 14 executing the control client 16 functions to display the data (e.g., as instructed by the control client 16), receive user inputs, compute the operation instructions based on the user inputs (e.g., as instructed by the control client 16), send operation instructions to the aerial system 12, store control client information (e.g., associated aerial system identifiers, security keys, user account information, user account preferences, etc.), or perform any other suitable functionality. The remote device 14 can be a user device (e.g., smartphone, tablet, laptop, etc.), a networked server system, or be any other suitable remote computing system. The remote device 14 can include one or more: outputs, inputs, communication systems, sensors, power sources, processing systems (e.g., CPU, memory, etc.), or any other suitable component. Outputs can include: displays (e.g., LED display, OLED display, LCD, etc.), audio speakers, lights (e.g., LEDs), tactile outputs (e.g., a tixel system, vibratory motors, etc.), or any other suitable output. Inputs can include: touchscreens (e.g., capacitive, resistive, etc.), a mouse, a keyboard, a motion sensor, a microphone, a biometric input, a camera, or any other suitable input. Communication systems can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system. Sensors can include: orientation sensors (e.g., accelerometer, gyroscope, etc.), ambient light sensors, temperature sensors, pressure sensors, optical sensors, acoustic sensors, or any other suitable sensor. In one variation, the remote device 14 can include a display (e.g., a touch-sensitive display including a touchscreen overlaying the display), a set of radios (e.g., Wi-Fi, cellular, BLE, etc.), and a set of orientation sensors. However, the remote device 14 can include any suitable set of components.

The aerial system 12 functions to fly within a physical space, capture video, stream the video in near-real time to the remote device 14, and operate based on operation instructions received from the remote device 14.

The aerial system 12 can additionally process the video (e.g., video frames) prior to streaming the video to the remote device 14 and/or audio received from an onboard audio sensor; generate and automatically operate based on its own operation instructions (e.g., to automatically follow a subject); or perform any other suitable functionality. The aerial system 12 can additionally function to move the optical sensor's field of view (FOV) within the physical space. For example, the aerial system 12 can control macro movements (e.g., large FOV changes, on the order of meter adjustments), micro movements (e.g., small FOV changes, on the order of millimeter or centimeter adjustments), or any other suitable movement.

The aerial system 12 can perform certain functionality based on onboard processing of sensor data from onboard sensors. This functionality may include, but is not limited to:

Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

Figure 2:
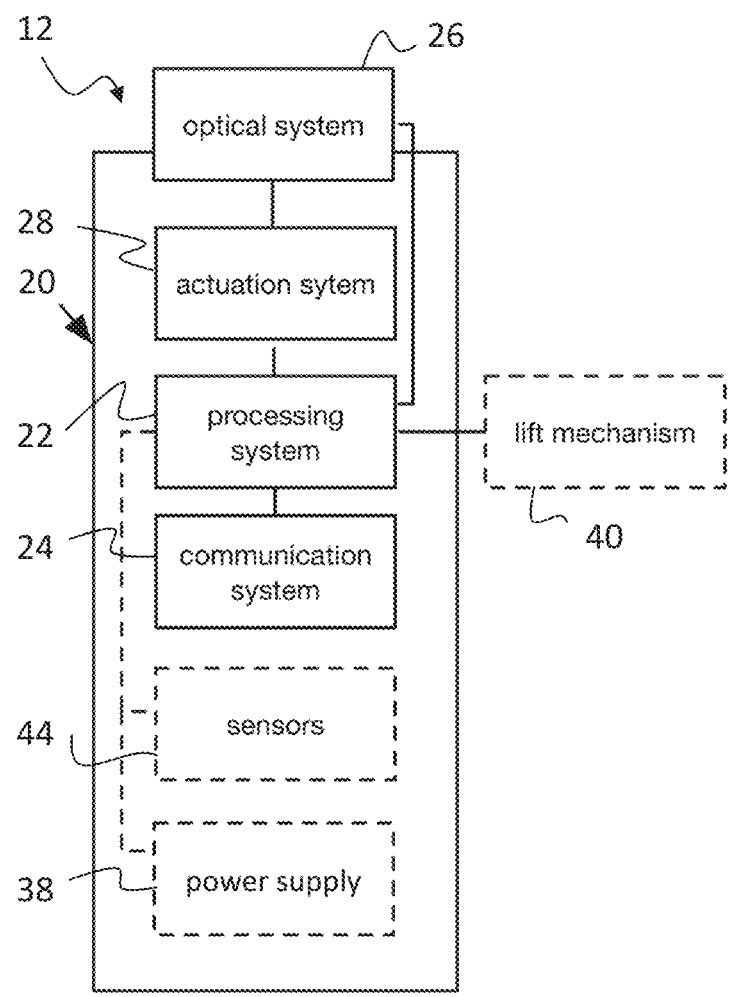
FIG. 2 is a second schematic representation of the aerial system, according to an embodiment of the present invention.
Figure 3:
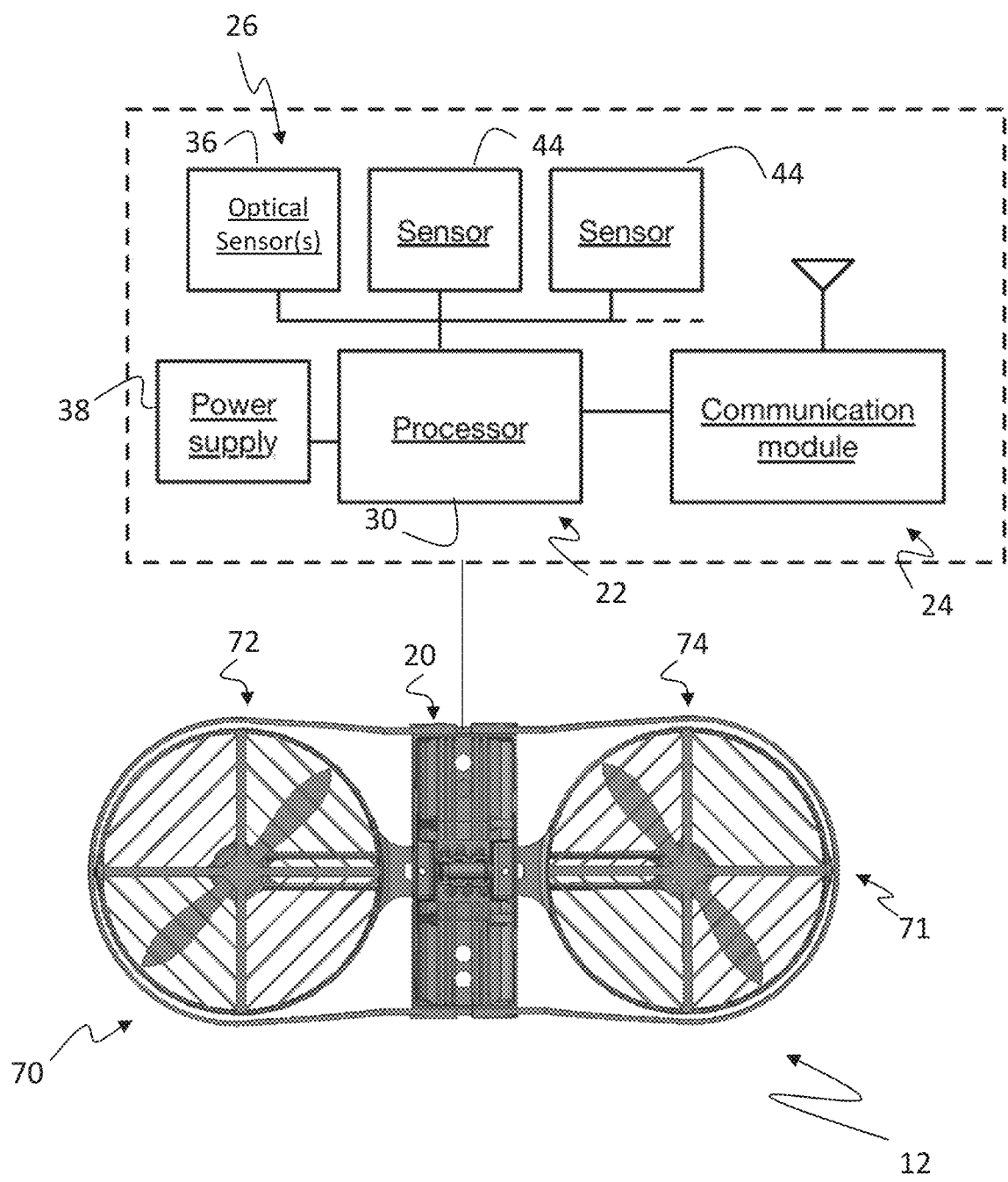
FIG. 3 is a third schematic representation of the system for controlling the aerial system and the aerial system according to an embodiment of the present invention.
Figure 4:
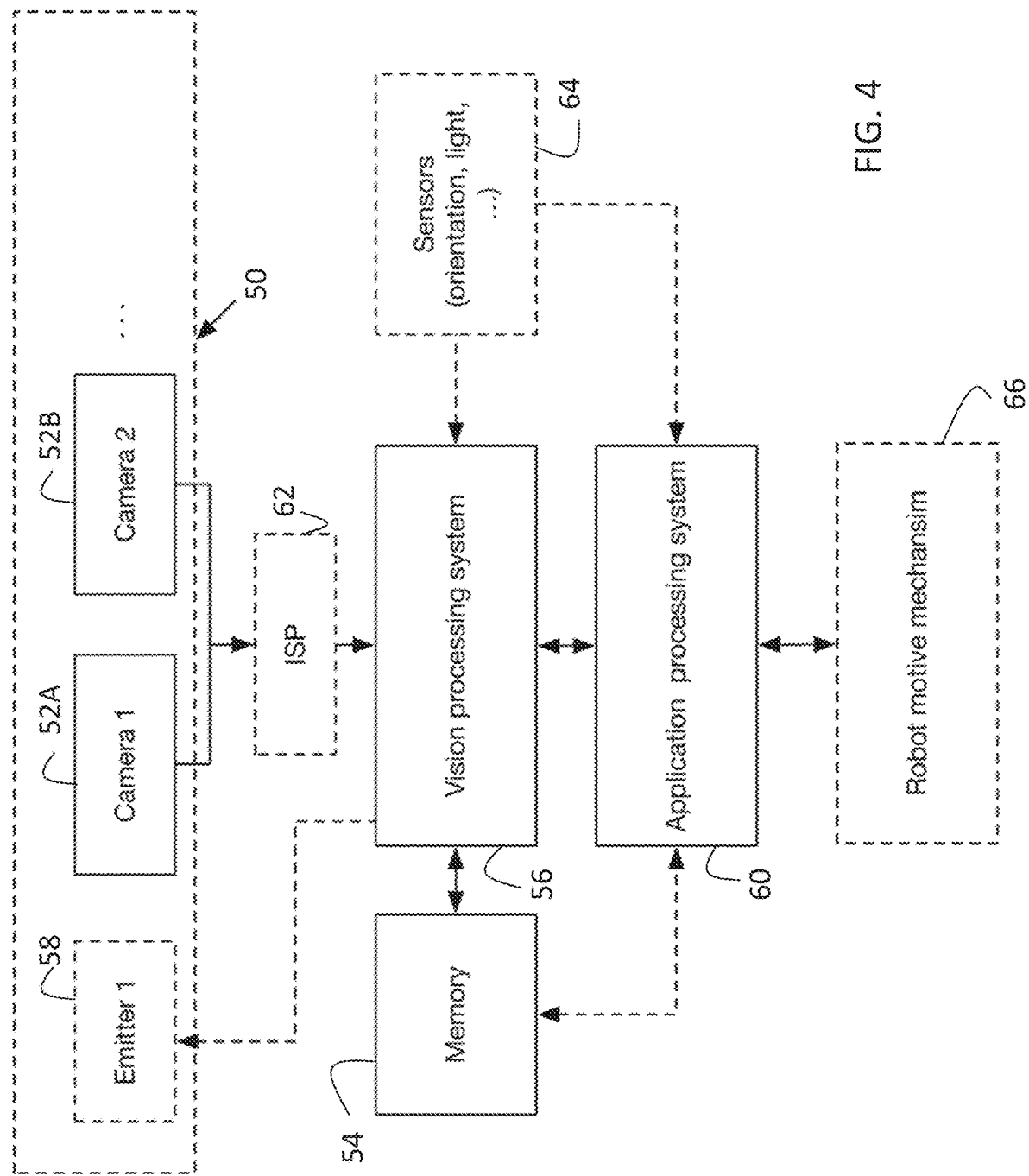
FIG. 4 is a schematic representation of an aerial system including an obstacle detection and avoidance system, according to an embodiment of the present invention.
Figure 5:
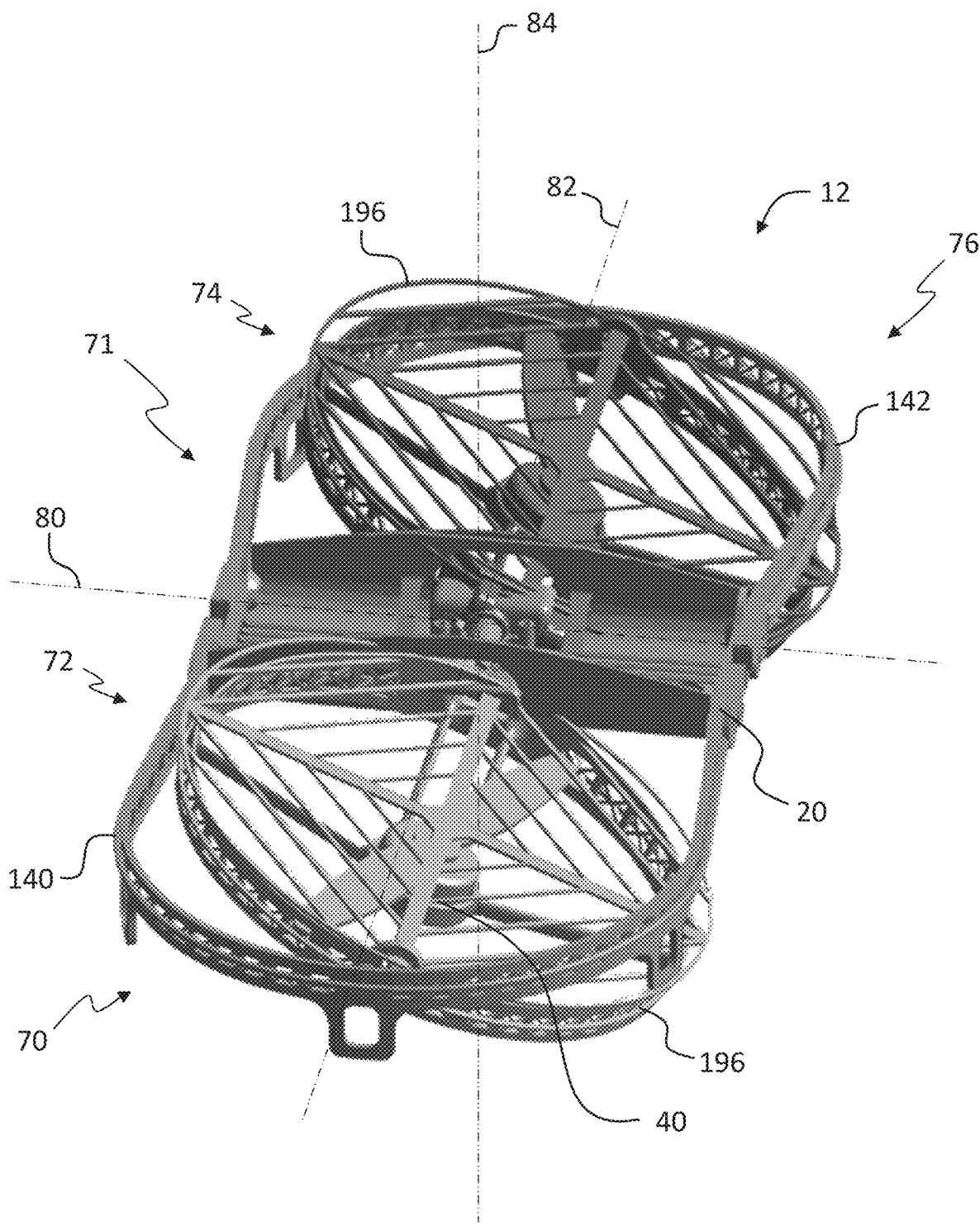
FIG. 5 is a perspective view of the aerial system shown in FIG. 1 including a frame assembly, according to an embodiment of the present invention.

As shown in FIGS. 2-4, the aerial system 12 (e.g., drone) may include a body 20, a processing system 22, a communication system 24, an optical system 26, and an actuation mechanism 28 mounting the optical system 26 to the body 20. The aerial system 12 may additionally or alternatively include one or more optical sensors 36, power supply 38, lift mechanisms 40, additional sensors 44, or any other suitable component (see below).

The body 20 of the aerial system 12 functions to support, mechanically protect, and/or retain the aerial system components. The body 20 can define a lumen, be a platform, or have any suitable configuration. The body 20 can be enclosed, open (e.g., a truss), or have any suitable construction. The body 20 can be made of metal, plastic (e.g., polymer), carbon composite, or any other suitable material. The body 20 can define a longitudinal axis, a lateral axis, a transverse axis, a front end, a back end (e.g., opposing the front end along the longitudinal axis), a top, a bottom (e.g., opposing the top along the transverse axis), or any other suitable reference. In one variation, while in flight, a transverse axis of the body 20 can be substantially parallel a gravity vector (e.g., perpendicular a ground plane) and the body's longitudinal and lateral axes can be substantially perpendicular the gravity vector (e.g., parallel the ground plane). However, the body 20 can be otherwise configured.

The body 20 may substantially encapsulate the communication system 24, power supply 38, and processing system 22, but can be otherwise configured. The body 20 can include a platform, a housing, or have any other suitable configuration. In one variation, the body 20 includes a main body housing the communication system 24, power supply 38, and a processing system 22.

The body 20 (and/or any other suitable aerial system components) can define a retention region that can be retained by a retention mechanism (e.g., a human hand, an aerial system dock, a claw, etc.). The retention region preferably surrounds a portion of one or more of the rotors, more preferably completely surrounding all of the rotors, thereby preventing any unintentional interaction between the rotors and a retention mechanism or other object near the aerial system 12. For example, a projection of the retention region onto an aerial system plane (e.g., lateral plane, rotor plane, etc.) can overlap (e.g., partially, completely, a majority of, at least 90% of, etc.) a projection of the swept area of one or more of the rotors (e.g., swept area of a rotor, total swept area of the set of rotors, etc.) onto the same aerial system plane.

The processing system 22 of the aerial system 12 functions to control aerial system operation. The processing system 22 can: stabilize the aerial system 12 during flight (e.g., selectively operate the rotors to minimize aerial system wobble in-flight); receive, interpret, and operate the aerial system 12 based on remote control instructions; and receive operation instructions from the communication system 24, interpret the operation instructions into machine instructions, and control aerial system components based on the machine instructions (individually or as a set). The processing system 22 can additionally or alternatively process the images recorded by the camera, stream images to the remote device 14 (e.g., in real- or near-real time), or perform any other suitable functionality. The processing system 22 can include one or more processors 30 (e.g., CPU, GPU, microprocessor, etc.), memory (e.g., Flash, RAM, etc.), or any other suitable processing component. In one variation, the processing system 22 can additionally include dedicated hardware that automatically processes the images (e.g., de-warps the image, filters the image, crops the image, etc.) prior to transmission to the remote device 14. The processing system 22 is preferably connected to the active components of the aerial system 12 and mounted to the body 20, but can alternatively be otherwise related to aerial system components.

The processing system 22 is preferably configured to receive and interpret measurements sampled by the sensors 36, 44, more preferably by combining measurements sampled by disparate sensors (e.g., combining camera and accelerometer data). The aerial system 12 can include one or more processing systems, wherein different processors can perform the same functionality (e.g., function as a multi-core system), or be specialized. The processing system 22 is preferably powered by the power supply 38, but can be otherwise powered. The processing system 22 is preferably connected to and controls the sensors 36, 44, communication system 24, and lift mechanism 40, but can additionally or alternatively be connected to and interact with any other suitable component.

The communication system 24 of the aerial system functions to send and/or receive information from the remote device 14. The communication system 24 is preferably connected to the processing system 22, such that the communication system 24 sends and/or receives data form the processing system 22, but can alternatively be connected to any other suitable component. The aerial system 12 can include one or more communication systems 24 of one or more types. The communication system 24 can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system 24. The communication system 24 preferably shares at least one system protocol (e.g., BLE, RF, etc.) with the remote device 14, but can alternatively communicate with the remote device 14 via an intermediary communication system (e.g., a protocol translation system). However, the communication system 24 can be otherwise configured.

The optical system 26 of the aerial system 12 functions to record images of the physical space proximal the aerial system 12. The optical system 26 is preferably mounted to the body 20 via the actuation mechanism 28, but can alternatively be statically mounted to the body 20, removably mounted to the body 20, or otherwise mounted to the body 20. The optical system 26 is preferably mounted to the front end of the body 20, but can optionally be mounted to the bottom (e.g., proximal the front), top, back end, or any other suitable portion of the body 20. The optical system 26 is preferably connected to the processing system 22, but can alternatively be connected to the communication system 24 or to any other suitable system. The optical system 26 can additionally include dedicated image processing hardware that automatically processes images recorded by the camera prior to transmission to the processor or other endpoint. The aerial system 12 can include one or more optical systems 26 of same or different type, mounted to the same or different position. In one variation, the aerial system 12 includes a first optical system 26, mounted to the front end of the body 20, and a second optical system 26, mounted to the bottom of the body 20. The first optical system 26 can actuate about a pivotal support, and the second optical system 26 can be substantially statically retained relative to the body 20, with the respective active surface substantially parallel the body bottom. The first optical system 26 can include a high-definition optical sensor 36, while the second optical system 26 can include a low definition optical sensor 36. However, the optical system or systems 26 can be otherwise configured.

The optical system 26 can include one or more optical sensors 36 (see FIG. 4). The one or more optical sensors 36 can include: a single lens camera (e.g., CCD camera, CMOS camera, etc.), a stereo-camera, a hyperspectral camera, a multispectral camera, or any other suitable image sensor. However, the optical system 26 can be any other suitable optical system 26. The optical system 26 can define one or more active surfaces that receive light, but can alternatively include any other suitable component. For example, an active surface of a camera can be an active surface of a camera sensor (e.g., CCD sensor, CMOS sensor, etc.), preferably including a regular array of sensor pixels. The camera sensor or other active surface is preferably substantially planar and rectangular (e.g., having a first sensor edge, a second sensor edge opposing the first sensor edge, and third and fourth sensor edges each perpendicular to and extending from the first sensor edge to the second sensor edge), but can alternatively have any suitable shape and/or topography. The optical sensor 36 can produce an image frame. The image frame preferably corresponds with the shape of the active surface (e.g., rectangular, having a first and second frame edge opposing each other, etc.), more preferably defining a regular array of pixel locations, each pixel location corresponding to a sensor pixel of the active surface and/or pixels of the images sampled by the optical sensor 36, but can alternatively have any suitable shape. The image frame preferably defines aspects of the images sampled by the optical sensor 36 (e.g., image dimensions, resolution, pixel size and/or shape, etc.). The optical sensor 36 can optionally include a zoom lens, digital zoom, fisheye lens, filter, or any other suitable active or passive optical adjustment. Application of the optical adjustment can be actively controlled by the controller, manually controlled by the user 18 (e.g., wherein the user manually sets the adjustment), controlled by the remote device 14, or otherwise controlled. In one variation, the optical system 26 can include a housing enclosing the remainder of the optical system components, wherein the housing is mounted to the body 20. However, the optical system 26 can be otherwise configured.

The actuation mechanism 28 of the aerial system 12 functions to actionably mount the optical system 26 to the body 20. The actuation mechanism 28 can additionally function to dampen optical sensor vibration (e.g., mechanically stabilize the resultant image), accommodate for aerial system roll, or perform any other suitable functionality. The actuation mechanism 28 can be active (e.g., controlled by the processing system), passive (e.g., controlled by a set of weights, spring elements, magnetic elements, etc.), or otherwise controlled. The actuation mechanism 28 can rotate the optical system 26 about one or more axes relative to the body, translate the optical system 26 along one or more axes relative to the body, or otherwise actuate the optical system 26. The optical sensor(s) 36 can be mounted to the support along a first end, along an optical sensor back (e.g., opposing the active surface), through the optical sensor body, or along any other suitable portion of the optical sensor 36.

In one variation, the actuation mechanism 28 can include a motor (not shown) connected to a single pivoted support (e.g., gimbal), wherein the motor pivots the support about the rotational (or gimbal) axis based on instructions received from the controller. The support is preferably arranged with the rotational axis substantially parallel the lateral axis of the body 20, but can alternatively be arranged with the rotational axis at any other suitable orientation relative to the body 20. The support is preferably arranged within a recessed cavity defined by the body 20, wherein the cavity further encompasses the optical sensor 36 but can alternatively be arranged along the body exterior or arranged at any other suitable portion of the body 20. The optical sensor 36 is preferably mounted to the support with the active surface substantially parallel the rotational axis (e.g., with the lateral axis, or axis parallel the lateral axis of the body 20, substantially parallel the rotational axis), but can alternatively be arranged with the active surface arranged at any suitable angle to the rotational axis.

The motor is preferably an electric motor, but can alternatively be any other suitable motor. Examples of electric motors that can be used include: DC motors (e.g., brushed motors), EC motors (e.g., brushless motors), induction motor, synchronous motor, magnetic motor, or any other suitable electric motor. The motor is preferably mounted to the body 20 (e.g., the body interior), electrically connected to and controlled by the processing system 22, and electrically connected to and powered by a power supply or system 38. However, the motor can be otherwise connected. The actuation mechanism 28 preferably includes a single motor-support set, but can alternatively include multiple motor-support sets, wherein auxiliary motor-support sets can be arranged orthogonal (or at any other suitable angle to) the first motor-support set.

In a second variation, the actuation mechanism 28 can include a set of pivoted supports and weights connected to the optical sensor 36 offset from the optical sensor center of gravity, wherein the actuation mechanism 28 passively stabilizes the optical sensor 36.

The power supply 38 of the aerial system 12 functions to power the active components of the aerial system 12. The power supply 38 is preferably mounted to the body 20, and electrically connected to all active components of the aerial system 12 (e.g., directly or indirectly), but can be otherwise arranged. The power supply 38 can be a primary battery, secondary battery (e.g., rechargeable battery), fuel cell, energy harvester (e.g., solar, wind, etc.), or be any other suitable power supply. Examples of secondary batteries that can be used include: a lithium chemistry (e.g., lithium ion, lithium ion polymer, etc.), nickel chemistry (e.g., NiCad, NiMH, etc.), or batteries with any other suitable chemistry.

A lift mechanism 40 of the aerial system 12 functions to enable aerial system flight. The lift mechanism 40 preferably includes a set propeller blades 42 driven by one or more motors (see below), but can alternatively include any other suitable propulsion mechanism. The lift mechanism 40 is may be mounted to the body 20 and/or aerial system 12 and controlled by the processing system 22. The aerial system 12 can include multiple lift mechanisms 40. For example, the aerial system 12 may include two or four lift mechanisms 40, wherein the lift mechanisms 40 are substantially evenly distributed about the perimeter of the aerial system 12 (e.g., wherein the lift mechanisms 40 of each pair oppose each other across the body 20). In the illustrated embodiment, the aerial system 12 includes two opposing lift mechanism 40, however, the lift mechanisms 40 can be otherwise configured.

Additional sensors 44 of the aerial system function to record signals indicative of aerial system operation, the ambient environment surrounding the aerial system 12 (e.g., the physical space proximal the aerial system 12), or any other suitable parameter. The sensors 44 are preferably mounted to the body 20 and controlled by the processing system 22, but can alternatively be mounted to any other suitable component and/or otherwise controlled. The aerial system 12 can include one or more sensors 36, 44. Examples of sensors that can be used include: orientation sensors (e.g., inertial measurement sensors, accelerometer, gyroscope, altimeter, magnetometer, etc.), ambient light sensors, temperature sensors, pressure sensors, optical sensors, acoustic sensors (e.g., transducers, microphones), voltage sensors, current sensors (e.g., Hall effect sensors), air flow meter, touch sensors (e.g., resistive, capacitive, etc.), proximity sensors, force sensors (e.g., strain gauge meter, load cell), vibration sensors, chemical sensors, sonar sensors, location sensor (e.g., GPS, GNSS, triangulation, etc.), or any other suitable sensor.

In one variation, the aerial system 12 includes a first camera mounted (e.g., statically or rotatably) along a first end of the aerial system body with a field of view intersecting the lateral plane of the body; a second camera mounted along the bottom of the aerial system body with a field of view substantially parallel the lateral plane; and a set of orientation sensors, such as an altimeter and accelerometer. However, the system can include any suitable number and arrangement of any sensor type.

The aerial system 12 can additionally include inputs (e.g., microphones, cameras, etc.), outputs (e.g., displays, speakers, light emitting elements, etc.), or any other suitable component.

The aerial system 12 can optionally be used with a remote computing system, or with any other suitable system. The aerial system 12 functions to fly, and can additionally function to take photographs, deliver loads, and/or relay wireless communications. The aerial system 12 is preferably a rotorcraft (e.g., quadcopter, helicopter, cyclocopter, etc.), but can alternatively be a fixed-wing aircraft, aerostat, or be any other suitable aerial system 12.

The remote computing system functions to receive auxiliary user inputs, and can additionally function to automatically generate control instructions for and send the control instructions to one or more aerial systems 12. Each aerial system 12 can be controlled by one or more remote computing systems. The remote computing system preferably controls the aerial system 12 through a client (e.g., a native application, browser application, etc.), but can otherwise control the aerial system 12. The remote computing system can be a user device, remote server system, connected appliance, or be any other suitable system. Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a Wi-Fi module, BLE, cellular module, etc.), or any other suitable component.

The system 10 may be configured for controller-free user drone interaction. Normally, the aerial system, or drone, 12 requires a separate device, e.g., the remote device 14. The remote device 14 may be embodied in different types of devices, including, but not limited to a ground station, remote control, or mobile phone, etc. . . . In some embodiments, control of the aerial system 12 may be accomplished by the user through user expression without utilization of the remote device 14. User expression may include, but is not limited to, any action performed by the user that do not include physical interaction with the remote device 14, including thought (through brain wave measurement), facial expression (including eye movement), gesture and/or voice. In such embodiments, user instructions are received directly via the optical sensors 36 and at least some of the other sensors 44 and processed by the onboard processing system 22 to control the aerial system 12.

In at least one embodiment, the aerial system 12 may be controlled without physical interaction with the remote device 14, however, a display of the remote device 14 may be used to display images and/or video relayed from the aerial system 12 which may aid the user 18 in controlling the aerial system 12. In addition, sensors 36, 44 associated with the remote device 14, e.g., camera(s) and/or a microphone (not show) may relay data to the aerial system 12, e.g., when the aerial system 12 is too far away from the user 18. The sensor data relayed from the remote device 14 to the aerial system 12 is used in the same manner as the sensor data from the on-board sensors 36, 44 are used to control the aerial system 12 using user expression.

In this manner, the aerial system 12 may be fully controlled, from start to finish, either (1) without utilization of a remote device 14, or (2) without physical interaction with the remote device 14. Control of the aerial system 12 based on user instructions received at various on-board sensors 36, 44. It should be noted that in the following discussion, utilization of on-board sensors 36, 44 may also include utilization of corresponding or similar sensors on the remote device 14.

In general, the user 18 may utilize certain gestures and/or voice control to control take-off, landing, motion of the aerial system 12 during flight and other features, such as triggering of photo and/or video capturing. As discussed above, the aerial system 12 may provide the following features without utilization of, or processing by, a remote device 14:

Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

As detailed above, the aerial system 12 includes an optical system 26 that includes one or more optical sensor 36, such as a camera. The at least one on-board camera may be configured for live video streaming and computer vision analysis. Optionally the aerial system 12 can have at least one depth sensor (or stereo-vision pair) for multi-pixel depth sensing. Optionally the aerial system 12 can have at least one microphone on board for voice recognition and control.

In general, in order to provide full control of the aerial system 12, a plurality of user/drone interactions or activities from start to end of an aerial session are provided. The user/drone interactions, include, but are not limited to take-off and landing, owner recognition gesture recognition, facial expression recognition, and voice control.

The Frame Assembly 70

With reference to FIGS. 5-20D, an exemplary frame assembly 70 is illustrated. The frame assembly 70 includes the fuselage body 20 and a lift assembly 71 that is coupled to the fuselage body 20. The lift assembly 71 includes a first rotor assembly 72 and a second rotor assembly 74 that are moveable between a deployed position 76 (shown in FIGS. 5-10, and 18A-20D) and a stowed position 78 (shown in FIGS. 14-17).

In the illustrated embodiment, three mutually perpendicular axes 80, 82, and 84 extend through the aerial system 12, and are used to define a three-dimensional Cartesian coordinate system relative to aerial system 12. For example, a longitudinal axis 80 extends lengthwise along the fuselage body 20, a lateral axis 82 extends widthwise along the fuselage body 20 and is orientated perpendicular to the longitudinal axis 80, and a transverse axis 84 is orientated perpendicular to the longitudinal axis 80 and to the lateral axis 82. Referring to FIGS. 5-14, in the illustrated embodiment, the fuselage body 20 includes a first endwall 86, an opposite second endwall 88, and a pair of opposing sidewalls 90, 92 extending between the first endwall 86 and the second endwall 88 along a longitudinal axis 80. The pair of opposing sidewalls 90, 92, includes a first sidewall 90 and a second sidewall 92 that is spaced a distance apart from the first sidewall 90 measured along the lateral axis 82 that is perpendicular to the longitudinal axis 80. The fuselage body 20 also includes a support plate 94 that is coupled to the endwalls 86, 88 and sidewalls 90, 92. Each of the endwalls 86, 88 and the sidewalls 90, 92 extend outwardly from the support plate 94 along the transverse axis 84 and include an inner surface that defines an equipment cavity 96 therebetween. The equipment cavity 96 is sized and shaped to house various components of the aerial system 12 including, but not limited to, the processor 30, communication system 24, power supply 38, and/or sensors 36, 44. A fuselage midpoint 98 is defined by the support plate 94 along the longitudinal axis 80 between the first endwall 86 and the second endwall 88. In one embodiment, the center-of-gravity of the aerial system 12 is located at the fuselage midpoint 98. In other embodiments, the center-of-gravity of the aerial system 12 is located at a position other than the fuselage midpoint 98.

The lift assembly 71 includes the first rotor assembly 72 extending outwardly from the first sidewall 90 and the second rotor assembly 74 extending outwardly from the second sidewall 92 of the pair of opposing sidewalls. In addition, the lift assembly 71 includes one or more positioning assemblies 100, 102 that are coupled to the fuselage body 20 and to the rotor assemblies 72, 74 for supporting the rotor assemblies 72, 74 from the fuselage body 20. The positioning assemblies 100, 102 are configure to adjust a position of the rotor assemblies 72, 74 to facilitate the aerial flight operation of the aerial system 12 and to position the rotor assemblies 72, 74 between the deployed position 76 and the stowed position 78. In the illustrated embodiment, the lift assembly 71 includes a first positioning assembly 100 that is coupled to the first rotor assembly 72 and a second positioning assembly 102 that is coupled to the second rotor assembly 74.

In the illustrated embodiment, the first positioning assembly 100 is coupled to the first rotor assembly 72 and is configured to rotate the first rotor assembly 72 about a rotor assembly rotational axis 104 that is perpendicular to the longitudinal axis 80. The second positioning assembly 102 is coupled to the second rotor assembly 74 and to the fuselage body 20, and is configured to rotate the second rotor assembly 74 about the rotor assembly rotational axis 104. In addition, the first positioning assembly 100 is coupled to the second positioning assembly 102 such that the first positioning assembly 100 is rotatable about the rotor assembly rotational axis 104 independent of the second rotor assembly 74.

In the illustrated embodiment, each rotor assembly 72, 74 includes a rotor support assembly 106 and a lift mechanism 40 that is coupled to the rotor support assembly 106. The lift mechanism 40 includes a set of rotors 42, e.g. propeller blades, that are coupled to and driven by a propeller motor 108. The propeller motor 108 is configured to rotate the set of rotors 42 about a propeller rotational axis 110 (shown in FIG. 19) to provide lift and thrust force to operate the aerial system 12 through aerial maneuvers during flight. Each rotor support assembly 106 includes a support base 112 and a pair of support struts 114 that extend outwardly from the support base 112. The support base 112 is coupled to the lift mechanism 40. The support struts 114 are orientated substantially parallel to each other and are coupled between the support base 112 and the respective positioning assembly 100, 102 to support the lift mechanism 40 from the respect positioning assembly 100, 102.

In the illustrated embodiment, the first rotor assembly 72 includes a first lift mechanism 116 that is coupled to a first rotor support assembly 118. The first rotor support assembly 118 is pivotably coupled to the first positioning assembly 100 such that the first rotor assembly 72 is pivotable about a first pivot axis 120 that is parallel to the longitudinal axis 80. The second rotor assembly 74 includes a second lift mechanism 122 that is coupled to a second rotor support assembly 124. The second rotor support assembly 124 is pivotably coupled to the second positioning assembly 102 such that the second rotor assembly 74 is pivotable about a second pivot axis 126 that is parallel to the first pivot axis 120.

In the illustrated embodiment, the first rotor assembly 72 is in a mirrored relationship with the second rotor assembly 74 along the longitudinal axis 80. In one embodiment, the first rotor assembly 72 and the second rotor assembly 74 extend outwardly from the fuselage body 20 at the fuselage midpoint 98. In other embodiments, the first rotor assembly 72 and/or the second rotor assembly 74 extend outwardly from the fuselage body 20 at a point between the fuselage midpoint 98 and the first endwall 86 or a point between the fuselage midpoint 98 and the second endwall 88.

Figure 14:
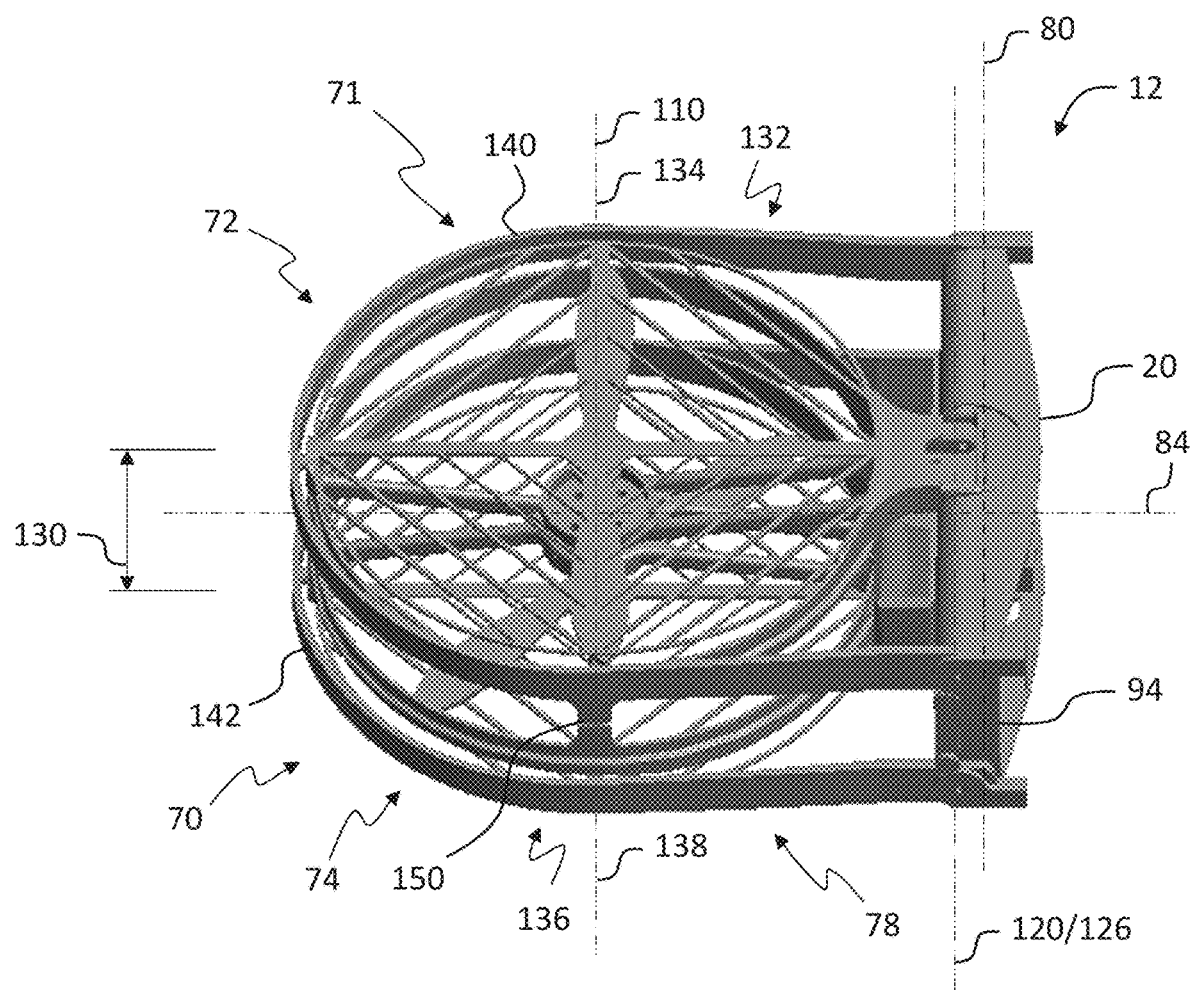
FIG. 14 is a perspective view of the aerial system shown in FIG. 5 including the lift assembly positioned in a stowed position, according to embodiments of the present invention.
Figure 15:
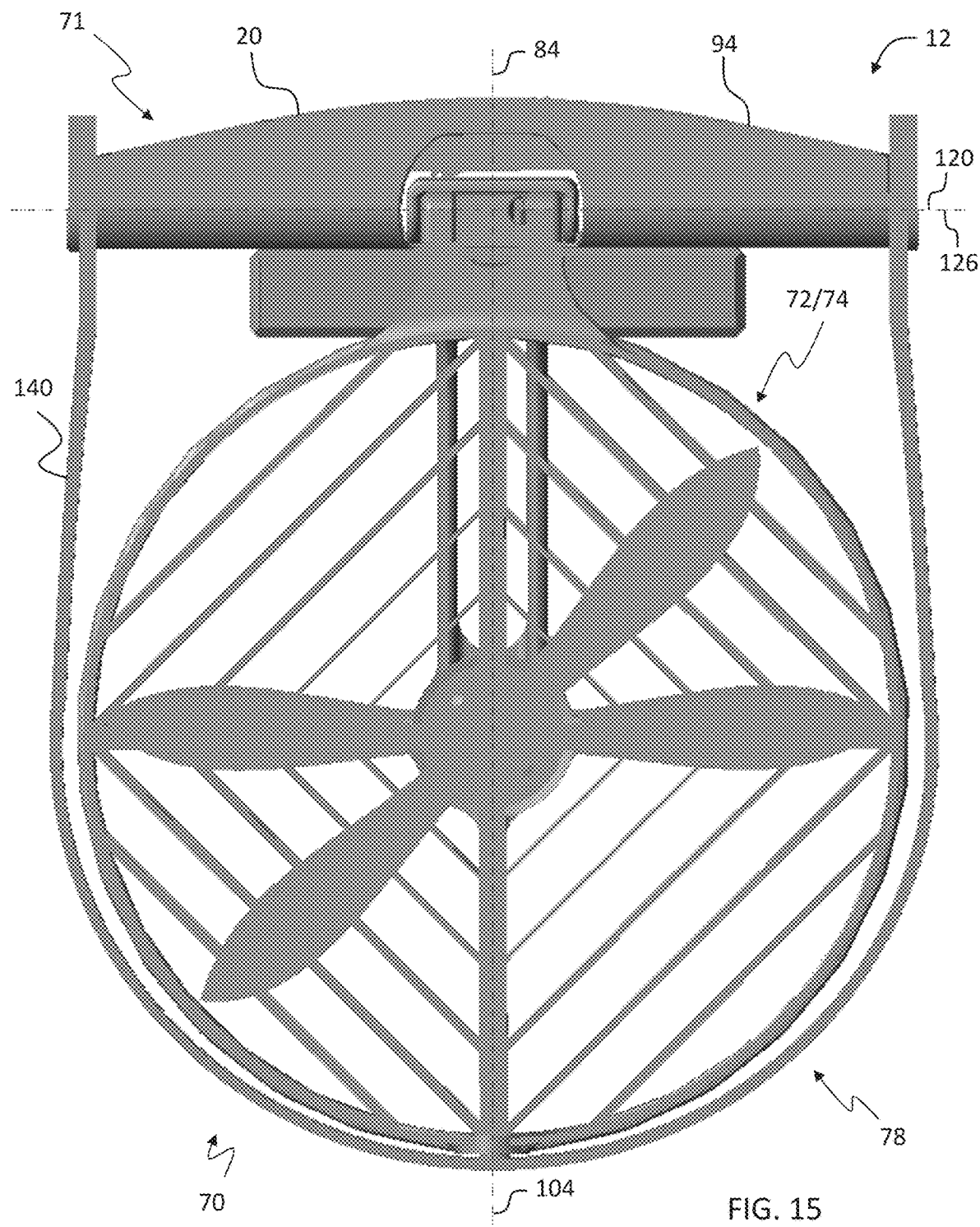
FIGS. 15-17 are various side views of the aerial system shown in FIG. 14 including the lift assembly positioned in the stowed position.
Figure 16:
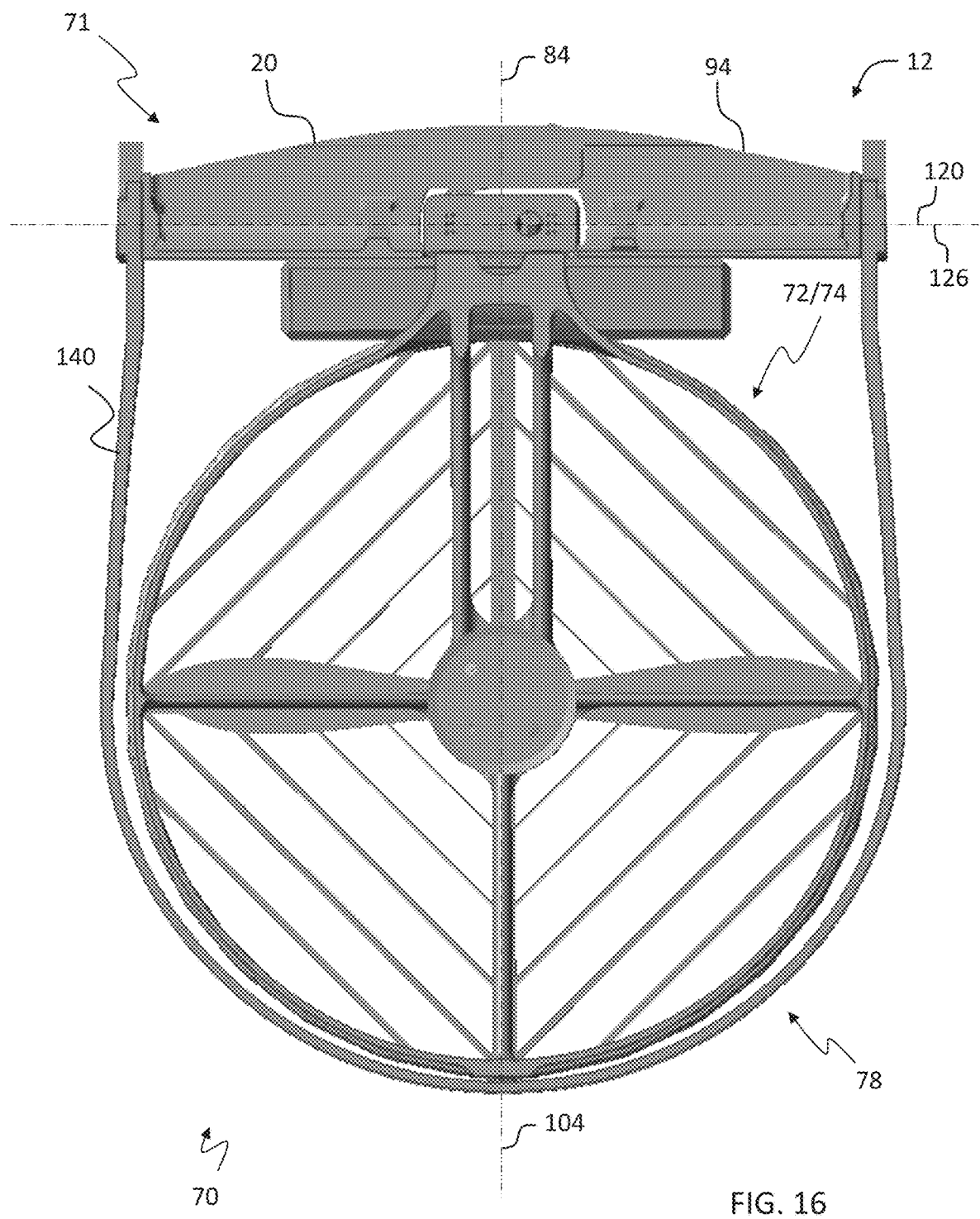
Figure 17:
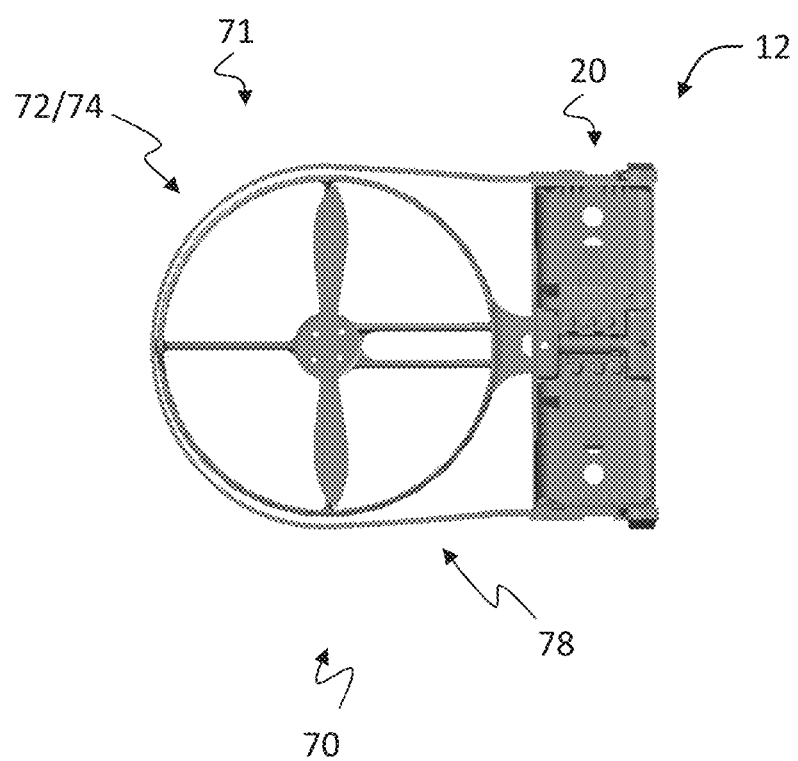
Figure 19:
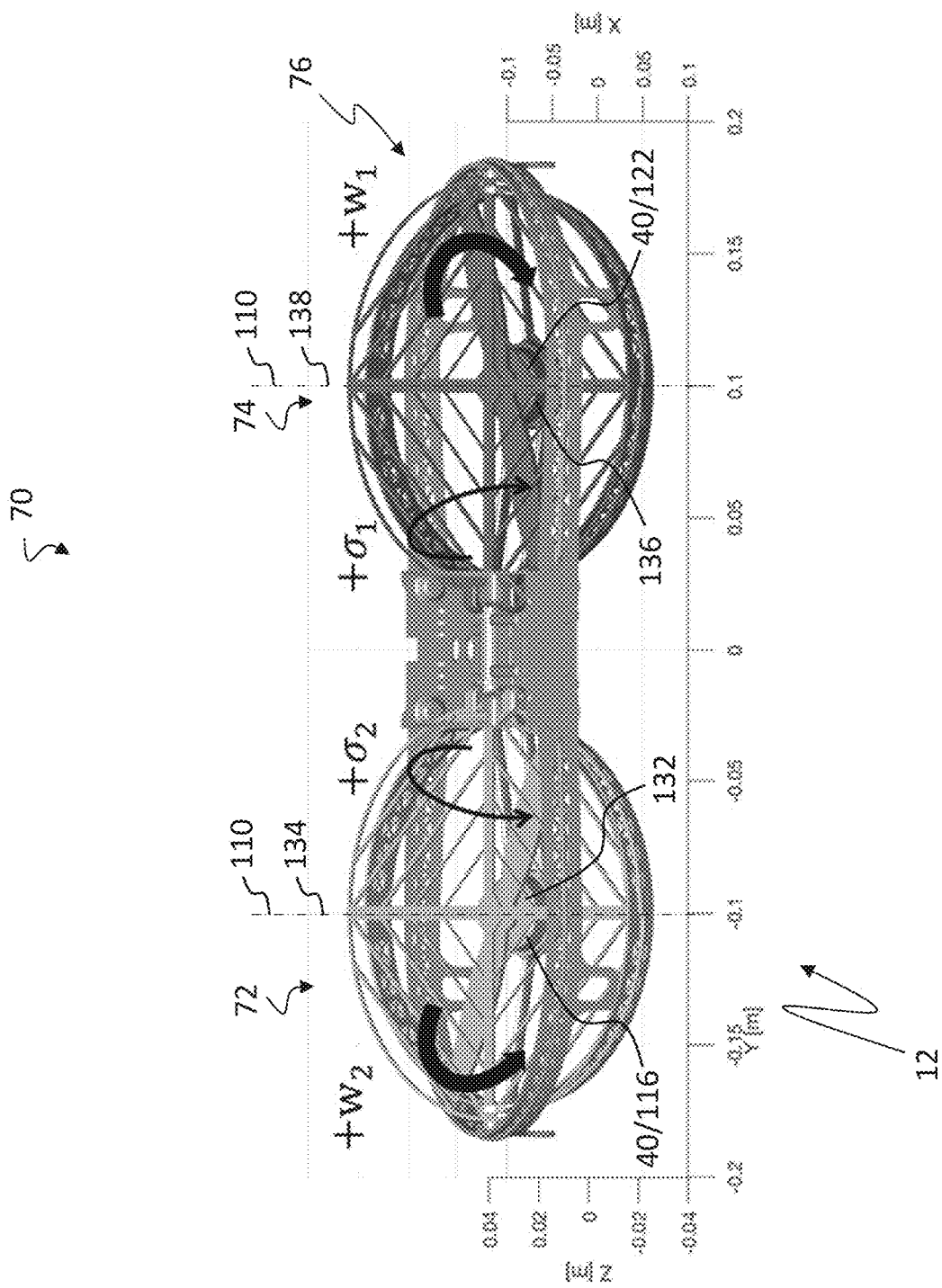

The lift assembly 71 is positionable between the deployed position 76 and the stowed position 78. When the lift assembly 71 is positioned in the deployed position 76, each rotor assembly 72 and 74 extend outwardly from the fuselage body 20 along the lateral axis 82. In the deployed position 76, the first lift mechanism 116 is spaced a first distance 128 from the second lift mechanism 122 measured along the lateral axis 82 (shown in FIG. 6). When the lift assembly 71 is positioned in the stowed position 78, the rotor assemblies 72, 74 are pivoted about the respective pivot axes 120, 126 and extend outwardly from the fuselage body 20 along the transverse axis 84. For example, as shown in FIG. 14, in the stowed position 78, each rotor support assembly 118, 124 is orientated along the transverse axis 84 and is substantially perpendicular to the support plate 94 of the fuselage body 20. In addition, in the stowed position 78, the rotor assemblies 72 and 74 are folded towards each other such that the first lift mechanism 116 is positioned closer to the second lift mechanism 122 and is spaced a second distance 130 (shown in FIG. 14) from the second lift mechanism 122 that is less than the first distance 128. In addition, when the lift assembly 71 is positioned in the stowed position 78, the first lift mechanism 116 is orientated coaxially with the second lift mechanism 122. For example, as shown in FIG. 19, the first lift mechanism 116 may include a first propeller assembly 132 that is rotatable about a first propeller rotational axis 134 and the second lift mechanism 122 may include a second propeller assembly 136 that is rotatable about a second propeller rotational axis 138. When the lift assembly 71 is in the stowed position 78 (shown in FIG. 14), the first propeller assembly 132 is orientated coaxially with the second propeller assembly 136 such that the first propeller rotational axis 134 is coaxially aligned with the second propeller rotational axis 138.

In the illustrated embodiment, the lift assembly 71 includes a first outer protective frame 140 that extends about a perimeter of the first lift mechanism 116, and a second outer protective frame 142 that extends about a perimeter of the second lift mechanism 122. The first outer protective frame 140 is pivotably coupled to the fuselage body 20 and is pivotable about the first pivot axis 120. The second outer protective frame 142 is pivotably coupled to the fuselage body 20 and is pivotable about the second pivot axis 126. Each of the first and second outer protective frames 140 and 142 is positionable at the deployed position 76 and the stowed position 78, and includes an arcuate inner surface that extends between a first frame end 144 and a second frame end 146. Each first frame end 144 is pivotably coupled to the first endwall 86 and each second frame end 146 is pivotably coupled to the second endwall 88. In the illustrated embodiment, the first outer protective frame 140 is pivotable about the first pivot axis 120, and the second outer protective frame is pivotable about the second pivot axis 126. In one embodiment, each first and second frame ends 144, 146 includes a locking hinge 148 to facilitate maintaining the position of the respective first and second outer protective frames 140, 142 in the deployed position 76 and the stowed position 78. For example, the locking hinge 148 may include a detent and groove arrangement to facilitate positioning the outer protective frames 140, 142 in the deployed position 76 and the stowed position 78. In addition, the first outer protective frame 140 and the second outer protective frame 142 may each include a locking clip 150 (shown in FIG. 14) that extends outwardly from the respective outer protective frames 140, 142. Each locking clip 150 is configured to interlock with a corresponding locking clip 150 to facilitate securing the lift assembly 71 in the stowed position 78.

In one embodiment, each rotor assembly 72, 74 includes a primary support strut 152 that is coupled between the lift mechanism 40 and the respective outer protective frame 140, 142, and is orientated along respective rotor assembly rotational axes 104. The primary support strut 152 is rotatably coupled to the respective outer protective frame 140, 142 via a pivot 154 such that the lift mechanism 40 is rotatable with respect to the respective outer protective frame 140, 142 about the respective rotor assembly rotational axes 104.

Figure 11:
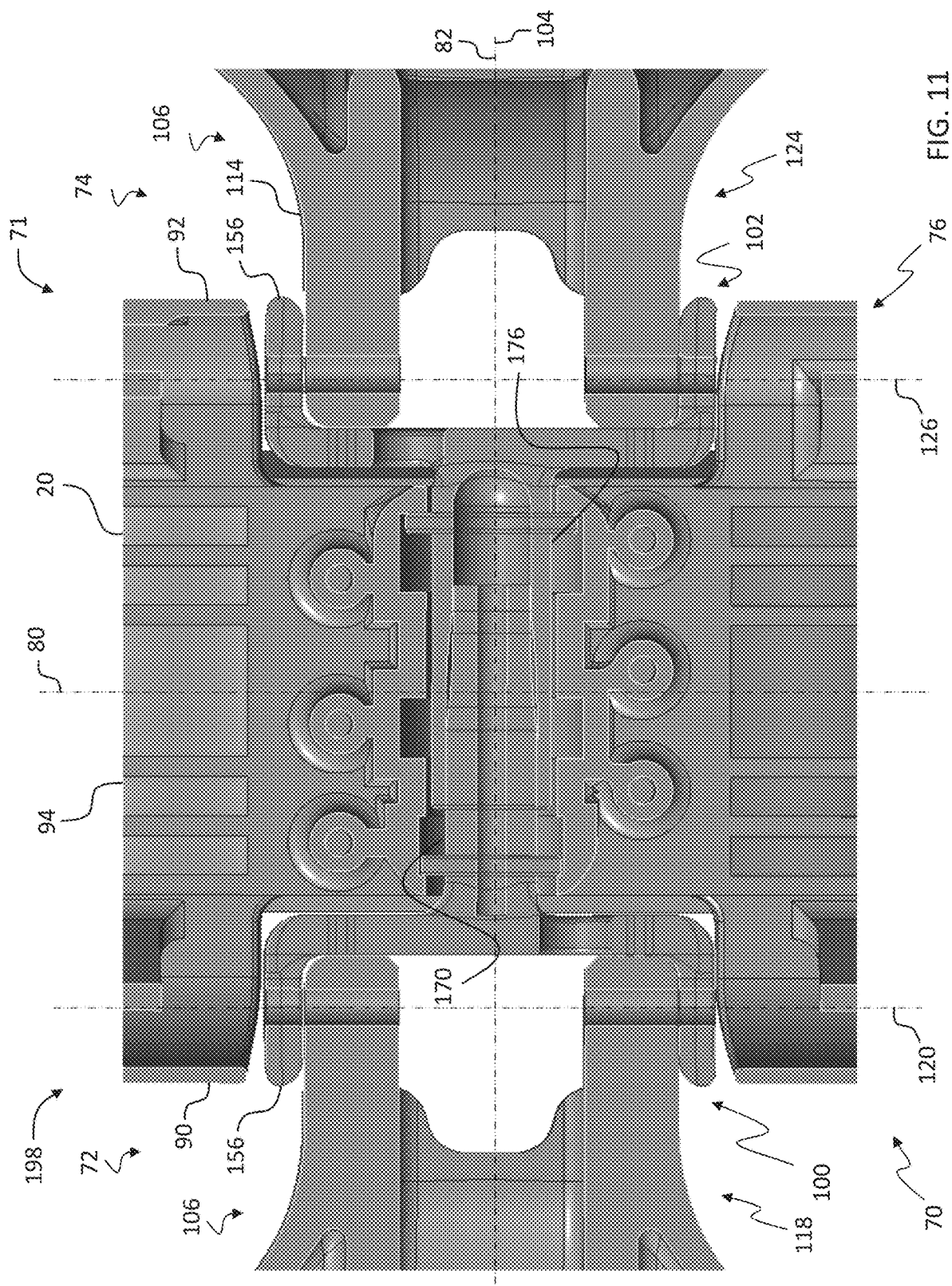
Figure 12:
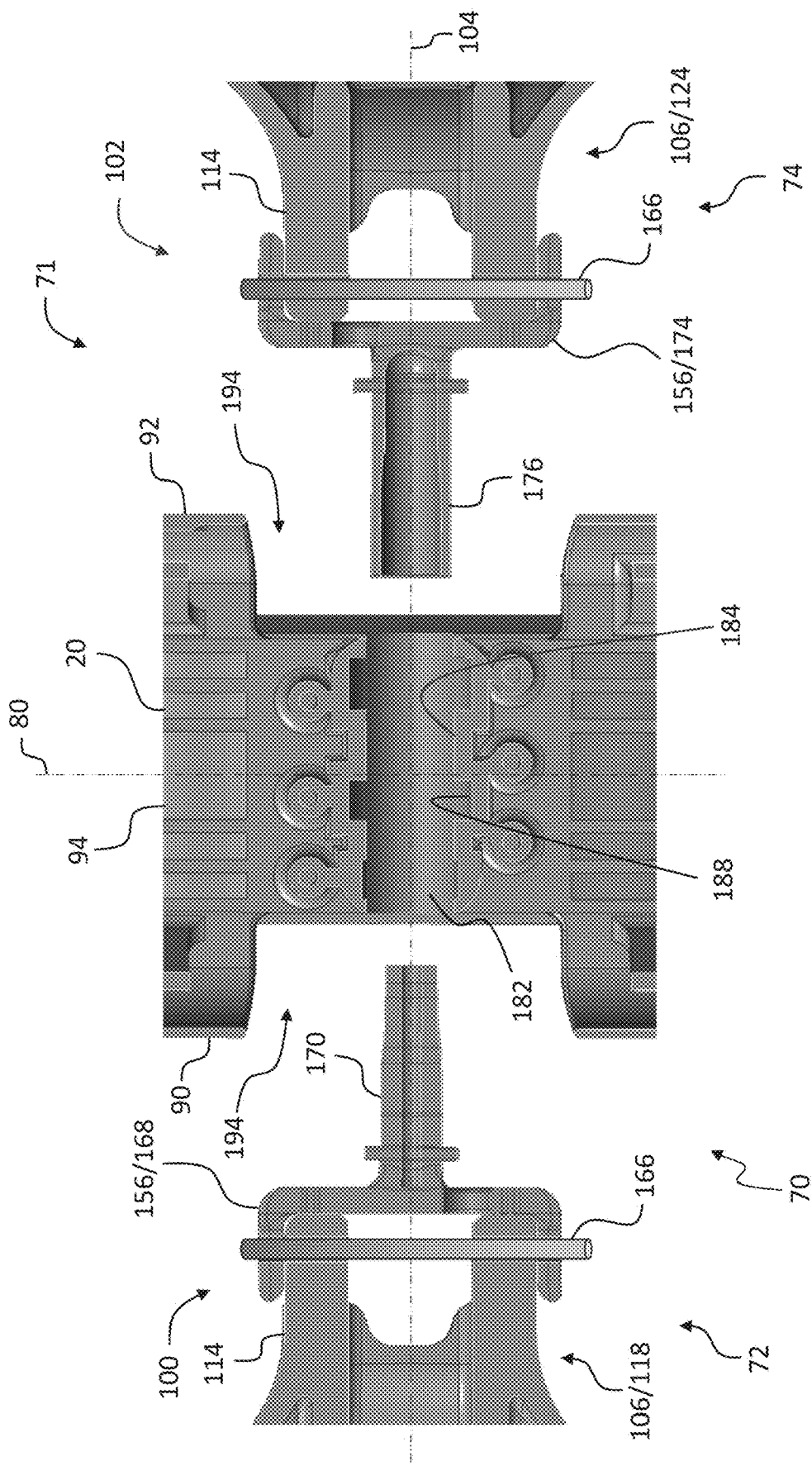
FIGS. 12 and 13 are exploded views of the lift assembly shown in FIG. 10.
Figure 13:
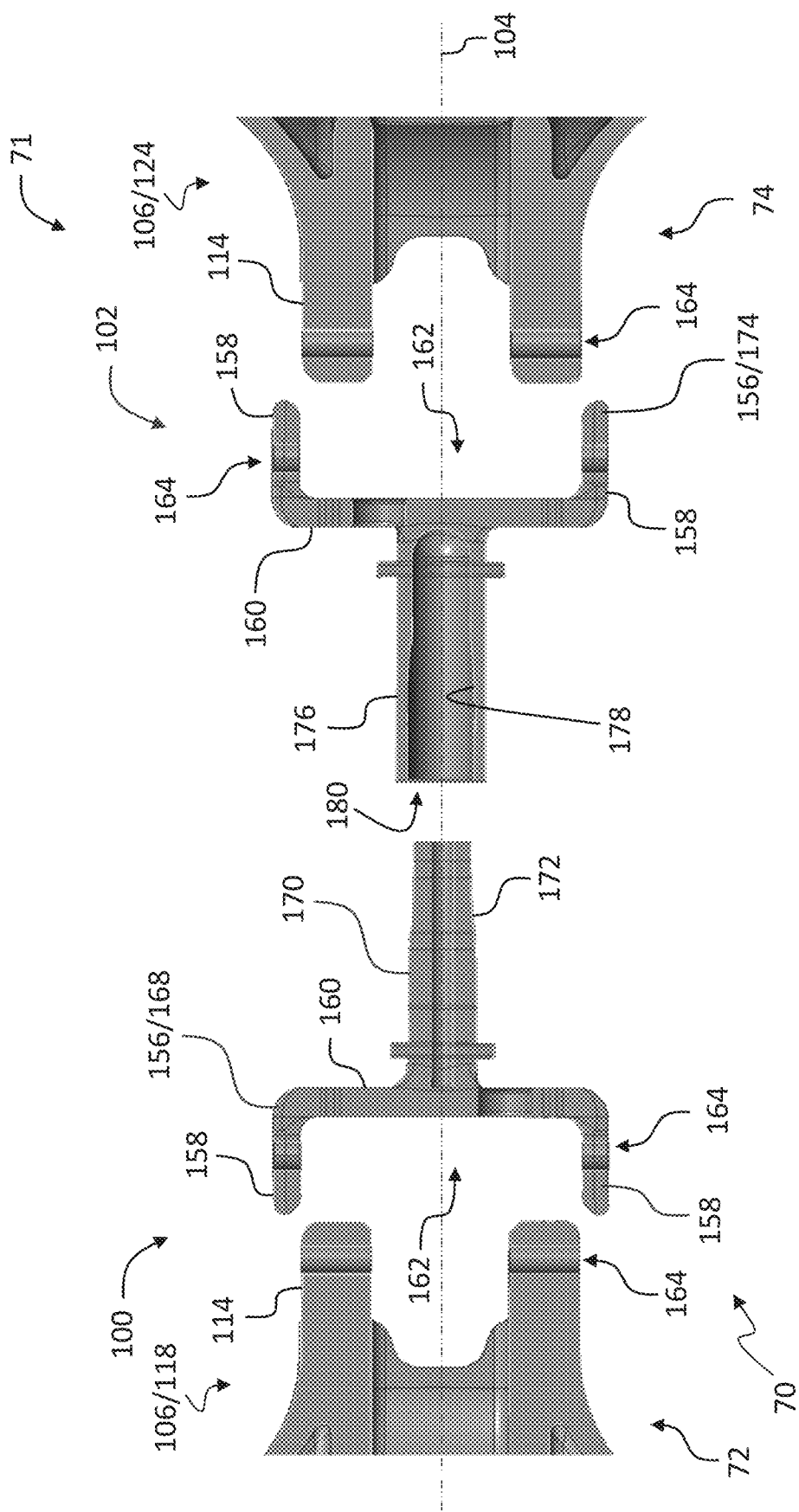

Referring to FIGS. 6-13, in the illustrated embodiment, each positioning assembly 100, 102 includes a hinge assembly 156. Each respective rotor support assembly 106 is pivotably coupled to a corresponding hinge assembly 156 to enable the respective rotor assemblies 72, 74 to pivot about the respective pivot axes 120, 126. For example, as shown in FIGS. 11-13, each hinge assembly 156 includes a pair of hinge flanges 158 extending outwardly from a base member 160. The pair of hinge flanges 158 extend outwardly from opposing ends of the base member 160 such that a gap 162 is defined between the hinge flanges 158. The pair of support struts 114 are positioned within the gap 162 such that an outer surface of each support strut 114 contacts an inner surface of each respective hinge flange 158. In addition, the hinge flanges 158 and the support struts 114 each include corresponding pin openings 164. A hinge pin 166 is inserted through the pin openings 164 of the hinge assembly 156 and the pair of support struts 114 to pivotably couple the pair of support struts 114 to the hinge assembly 156 to enable the respective rotor support assemblies 118 and 124 to pivot about the respective pivot axes 120, 126.

In the illustrated embodiment, the first positioning assembly 100 a first hinge assembly 168 and a positioning shaft 170 that extends outwardly from the first hinge assembly 168 in a direction opposite the hinge flanges 158 of the first hinge assembly 168. The positioning shaft 170 includes a tapered outer surface 172 and extends outwardly from the first hinge assembly 168 towards the second positioning assembly 102 and is orientated along the rotor assembly rotational axis 104. The second positioning assembly 102 includes a second hinge assembly 174 and a positioning sleeve 176 that extends outwardly from the second hinge assembly 174 towards the first positioning assembly 100. The positioning sleeve 176 extends in a direction opposite the hinge flanges 158 of the second hinge assembly 174 and is orientated along the rotor assembly rotational axis 104. The positioning sleeve 176 includes a tapered inner surface 178 that defines a positioning cavity 180 that is sized and shaped to receive the positioning shaft 170 therein. The positioning shaft 170 is positioned within the positioning sleeve 176 to enable the first positioning assembly 100 to rotate about the rotor assembly rotational axis 104 and with respect to the second positioning assembly 102. In addition, the positioning shaft 170 is configured to be inserted into the positioning cavity 180 such that the first rotor assembly 72 is at least partially supported by the second rotor assembly 74. Moreover, the positioning shaft 170 and positioning sleeve 176 are rotatably coupled together to enable the first rotor assembly 72 and the second rotor assembly to rotate about the rotor assembly rotational axis 104 independently.

Figure 9:
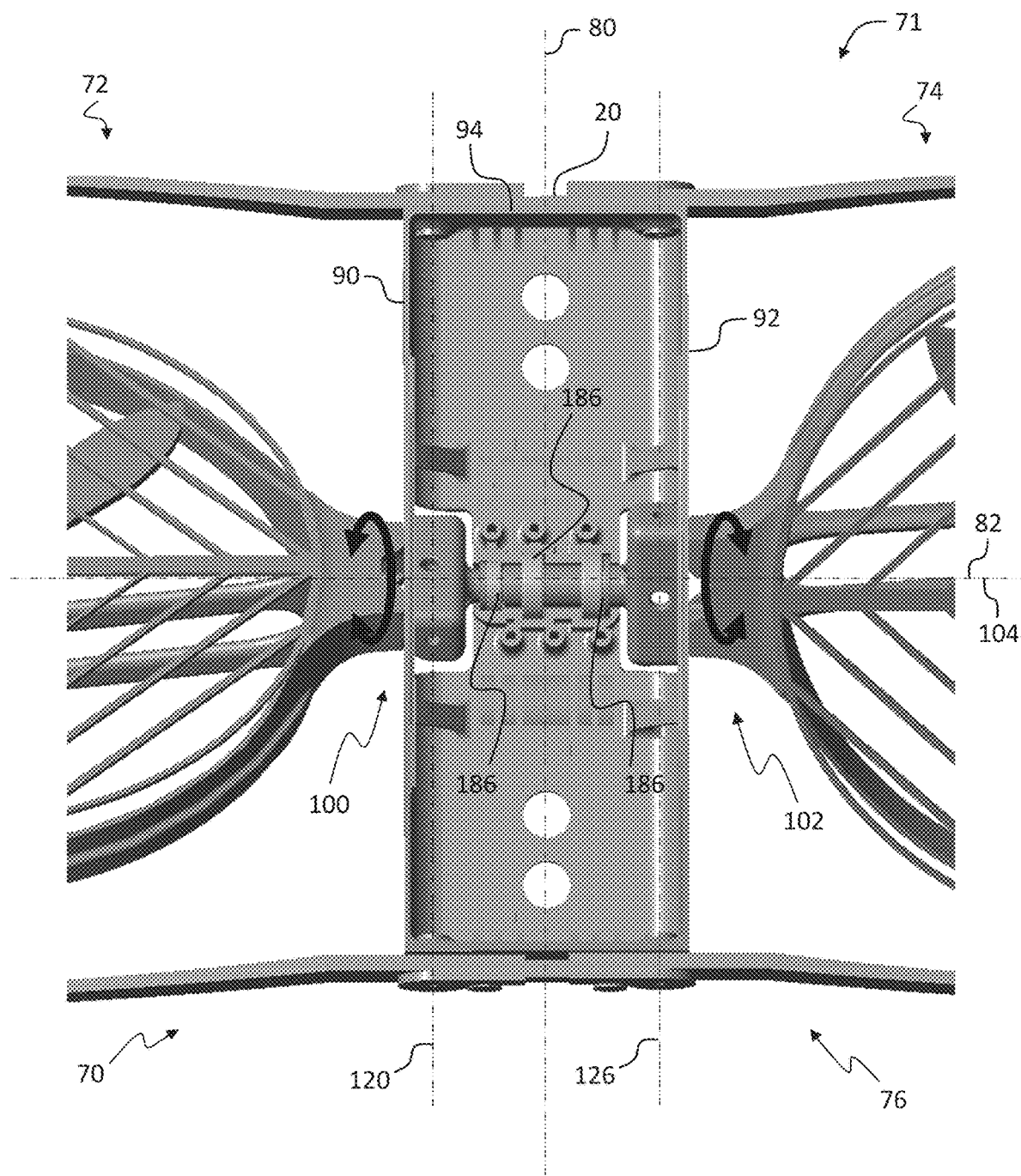
Figure 10:
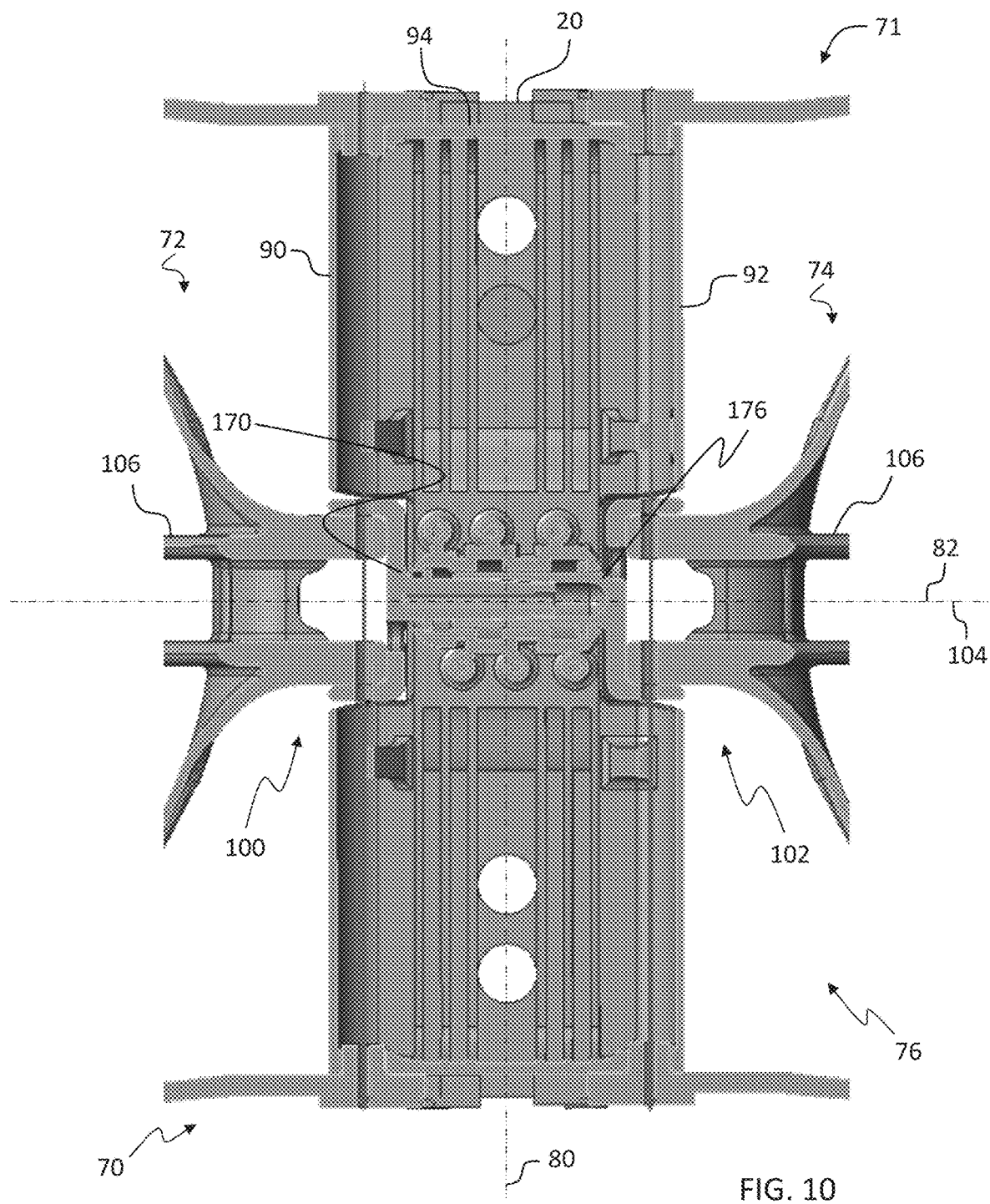

In the illustrated embodiment, the support plate 94 of the fuselage body 20 includes an inner surface 182 that includes a positioning groove 184 defined along the inner surface 182 and extending along the transverse axis 84. The positioning groove 184 is configured to receive the positioning sleeve 176 therein to facilitate coupling the positioning sleeve 176 to the fuselage body 20. For example, as shown in FIG. 9, in one embodiment, the second positioning assembly 102 may include one or more positioning bearings 186 that are coupled to an outer surface of the positioning sleeve 176 to facilitate rotating the positioning sleeve 176 with respect to the fuselage body 20. In addition, the positioning groove 184 may include one or more recessed portions 188 defined along the longitudinal axis 80 that are sized and shaped to receive a positioning bearing therein. The positioning bearings 186 are positioned within the corresponding recessed portion 188 defined within the positioning groove 184. In one embodiment, the positioning sleeve 176 and the positioning shaft 170 are inserted through one or more positioning bearings 186 that are oriented within the positioning groove 184 to facilitate rotatably coupling the respective positioning assemblies 100 and 102 to the fuselage body 20 such the positioning assemblies 100 and 102 are rotatable about the rotor assembly rotational axis 104.

In addition, in one embodiment, the lift assembly 71 includes a plurality of servo motor assemblies that are coupled to the positioning assemblies 100 and 102 to rotating the positioning assemblies in response to control signals received from the processor 30. For example, the lift assembly 71 may include a first servo motor assembly 190 that is coupled to the positioning shaft 170 and a second servo motor assembly 192 coupled to the positioning sleeve 176 (shown in FIG. 8). The first servo motor assembly 190 is configured to rotate the first rotor assembly 72 about the rotor assembly rotational axis 104, and the second servo motor assembly 192 is configured to rotate the second rotor assembly 74 about the rotor assembly rotational axis 104 independent of the first rotor assembly 72.

As shown in FIG. 12, each the first and second sidewalls 90, 92 each include a sidewall recessed portion 194 defined along an outer surface of the fuselage body 20. Each sidewall recessed portion 194 is sized and shaped to receive a corresponding hinge assembly 156 therein to enable the hinge assembly 156 to rotate about the rotor assembly rotational axis 104 without contacting the fuselage body 20 and to enable the rotor support assemblies 106 to pivot about the respective pivot axes 120 and 126 without contacting the fuselage body 20.

In one embodiment, each rotor assembly 72, 74 may include a safety grille or cage 196 for housing a respective lift mechanism 40. The safety cages 196 are coupled to the respective support assemblies 118 and 124, and extend parallel the rotor rotational plane and are arranged along a first and second side of the body 20. The cages can function as an intermediary component between the rotating rotor 42 and a retention mechanism (e.g., retention mechanism such as a user's hand). The cage 196 can extend along a single side of the body 20 (e.g., along the bottom of the rotors, along the top of the rotors), along a first and second side of the body 20 (e.g., along the top and bottom of the rotors), encapsulate the rotors (e.g., extend along all sides of the rotors), or be otherwise configured. The cages 196 may be formed integrally with other components of the rotor assembly 72, 74, or may be a comprised of one or more separate pieces which must be assembled to form the cage 196.

The cages 196 may include one or more apertures (e.g., airflow apertures) fluidly connecting one or more of the rotors to an ambient environment, which can function to enable the flow of air and/or other suitable fluids between the ambient environment and the rotors (e.g., enabling the rotors to generate an aerodynamic force that causes the aerial system 12 to move throughout the ambient environment). The apertures can be elongated, or can have comparable length and width. The apertures can be substantially identical, or can differ from each other. The apertures are preferably small enough to prevent components of a retention mechanism (e.g., fingers of a hand) from passing through the apertures. The geometrical transparency (e.g., ratio of open area to total area) of the frame near the rotors is preferably large enough to enable aerial system flight, more preferably enabling high-performance flight maneuvering. For example, each aperture can be smaller than a threshold size (e.g., smaller than the threshold size in all dimensions, elongated slots narrower than but significantly longer than the threshold size, etc.). In a specific example, the frame has a geometrical transparency of 80-90%, and the apertures (e.g., circles, polygons such as regular hexagons, etc.) each of define a circumscribed circle with a diameter of 12-16 mm. However, the body can be otherwise configured.

The cage 196 may include one or more cage components that are affixed to the rotor support assembly 106. In an alternative embodiment, a removable outer protective frame (not shown) and/or removable cages, may be used with the collapsible rotor assemblies. The removable outer protective frame and/or removable cages need to be removed prior to folding the aerial system 12.

With reference to FIGS. 5-17, an exemplary frame assembly 70 is illustrated. As briefly discussed above, in the illustrated embodiment the frame assembly 70 includes the body 20 and first and second rotor assemblies 72, 74. The rotor assemblies 72, 74 are moveable between a closed position (e.g. stowed position 78) and an open position (e.g. deployed position 76).

As discussed above, in the illustrated embodiment, the frame assembly 70 includes two rotor assemblies 72, 74. Each rotor assembly 72, 74 includes a safety grille or cage 196 for housing a respective rotor 42. The frame assembly 70 may include a respective outer protective frame 140, 142 that extends from the body 20 and extends around an outer circumference of the respective rotor assembly 72, 74. The first and second rotor assemblies 72, 74 are coupled to the body 20 by a hinge assembly 156. The first and second rotor assemblies 72, 74 are movable between an open position and a closed position. The hinge assembly 156 includes a first hinge 168 connected to the first assembly 72 at one end of the first hinge 156 and a second hinge 174 connected to the second assembly 74 at one end of the second hinge 174.

As shown in FIGS. 10-13, the opposite end of the first hinge 168 includes a tapered shaft 170. As shown, the tapered shaft 170 has a larger diameter at the edge nearest the one end of the hinge 168. The tapered shaft 170 extends from the one end of the first hinge 168 towards the second hinge 174. The diameter of the tapered shaft 170 becomes smaller as the tapered shaft 170 extends away from the first hinge 168.

The opposite end of the second hinge 174 includes a tapered sleeve 176 having a tapered wall thickness. The tapered shaft 170 is located within the tapered sleeve 176 forming a connecting assembly 198. The connecting assembly 198 is configured to allow the first and second rotor assemblies 72, 74 to rotate relative to the body 20. As shown in FIG. 13, the tapered sleeve 176 has a wall thickness. The tapered sleeve 176 extends from one end of the second hinge 174 towards the first hinge 168. The width of the tapered sleeve 176 becomes thinner as the tapered sleeve 176 extends away from the second hinge 174.

If the first or second rotor assembly 72, 74 experiences a crash or hits an obstacle, a strong impact load may be experienced. This may cause a large bending moment at the respective hinge 168, 174. The tapered shaft/sleeve design of the connecting assembly 198 enhances the strength of the connection between the first and second rotor assemblies 72, 74, thereby increasing the impact resistance load performance and reliability of the aerial system 12.

With reference to FIG. 9, a number of bearing 186 decrease the rolling resistance between the connection assembly 198 and the housing 20. Although three bearings 186 are shown, any number of bearings 186 may be utilized.

With reference to FIG. 11, the first hinge 168 allows the first rotor assembly 72 to rotate about a first hinge axis 120. The second hinge 174 allows the second rotor assembly 74 to rotate about a second hinge axis 126. In one embodiment, when the first and second rotor assemblies 72, 74 are in the open (or operating position), the first and second rotor assemblies are planar. With reference to FIG. 14, the rotor assemblies may be folded into a compact form for easy storage and carrying. As shown, the rotor assemblies 72, 74 may be coaxial (about a rotating of the propellers 42).

Figure 6:
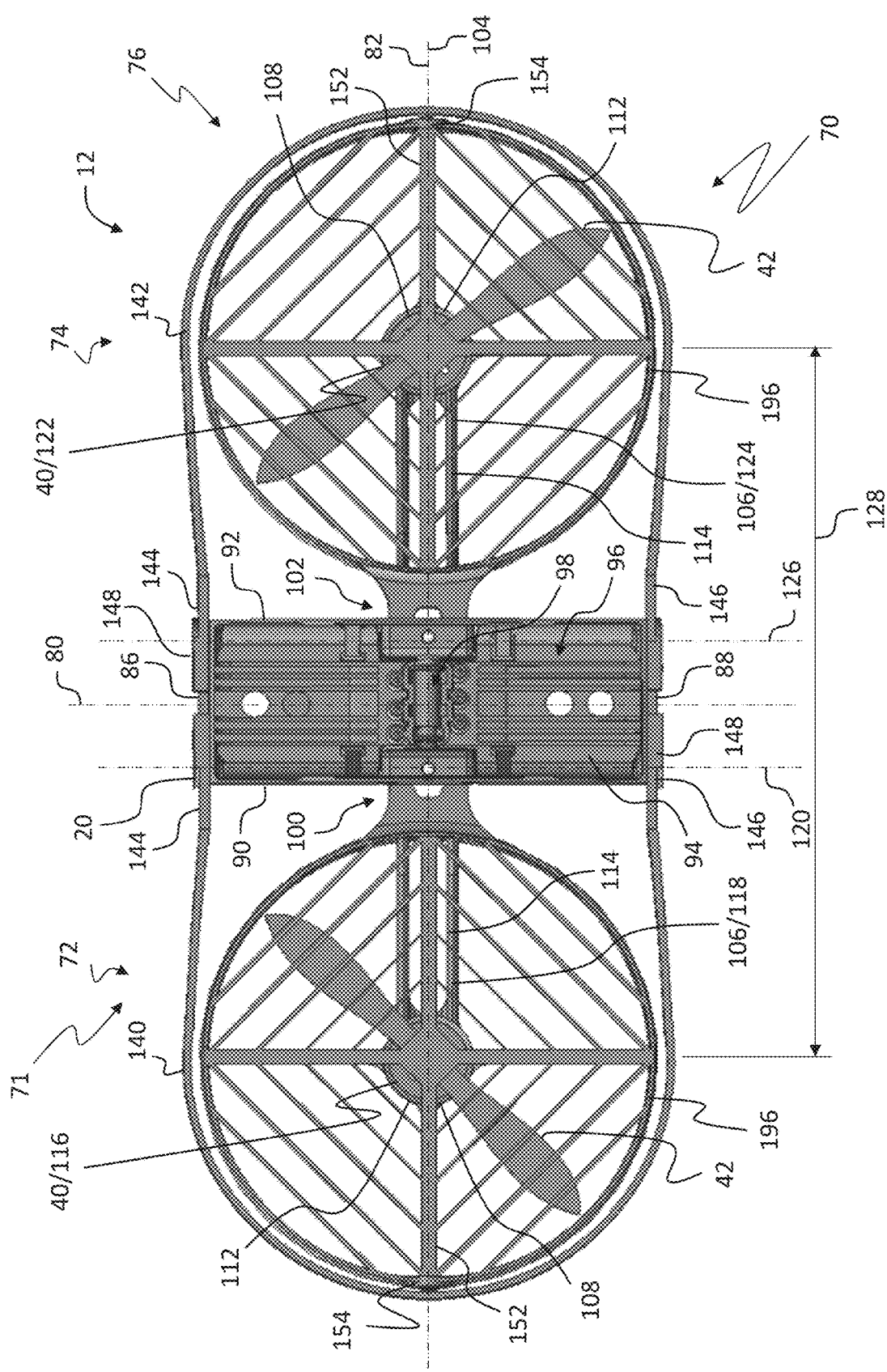
FIG. 6 is a top view of the aerial system shown in FIG. 5 including a lift assembly positioned in a deployed position, according to embodiments of the present invention.
Figure 7:
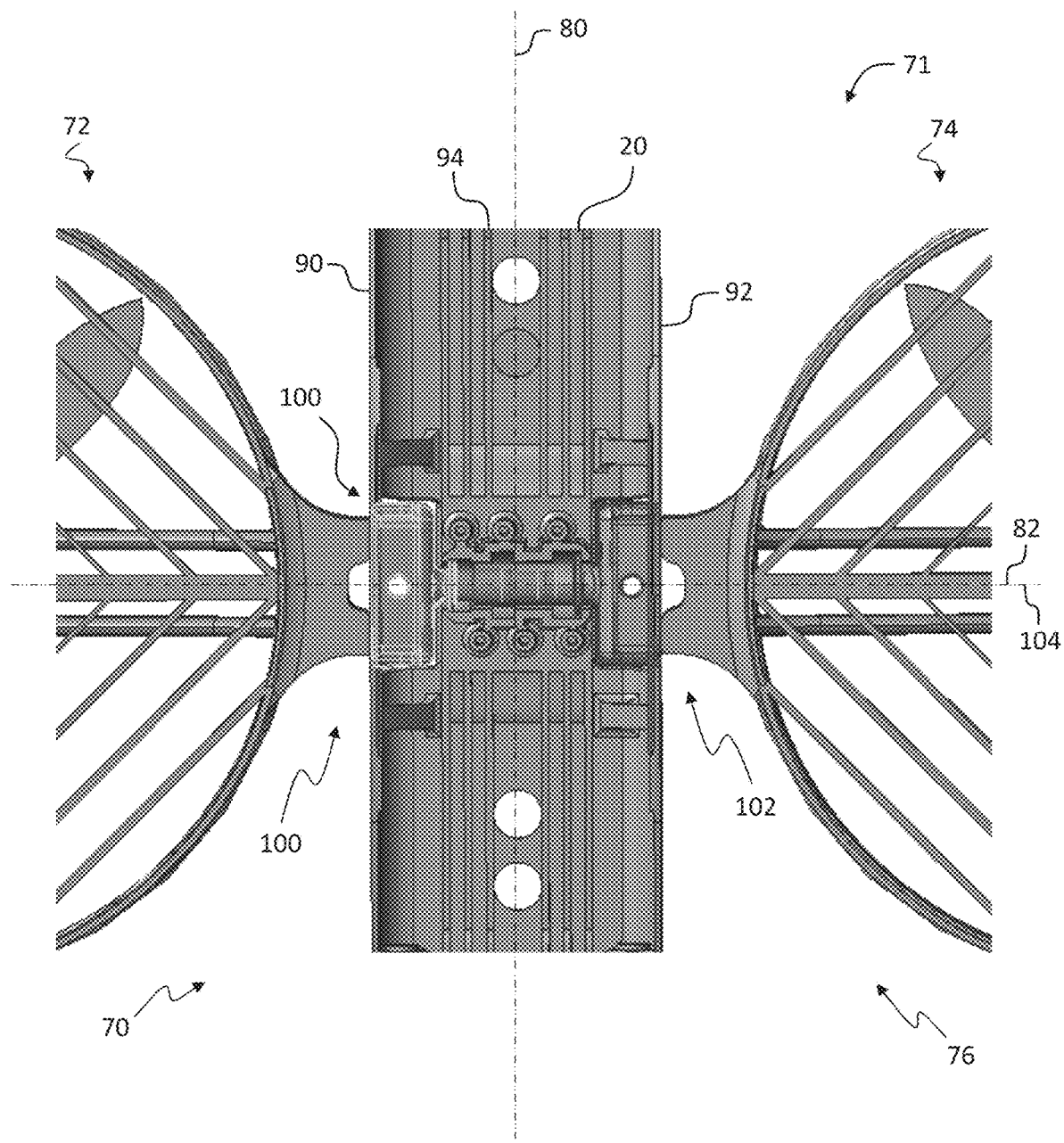
FIGS. 7-11 are enlarged views of the lift assembly shown in FIG. 6.
Figure 8:
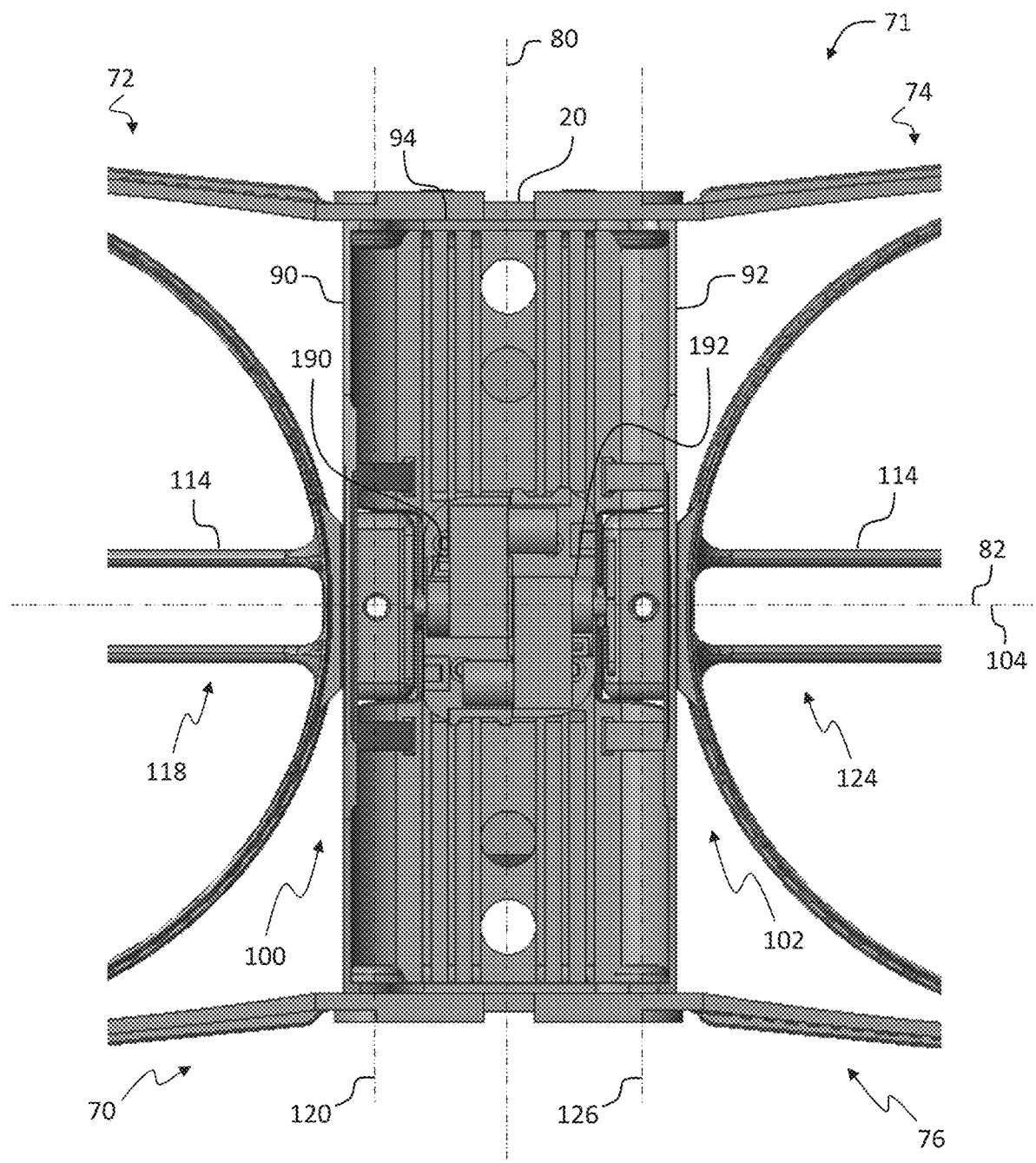

In one aspect of the present invention, when the aerial system 12 is unfolded, i.e., the first and second rotor assemblies 72, 74 are in the open position, the frame 70 provides support for the rotor assemblies 72, 74 through bearings 186 between the rotor assemblies 72, 74 and the outer protective frame 140, 142 (see FIG. 6). The outer protective frame 140, 142 may significantly reduce the chance of a crash after a collision with an obstacle by providing cushioning and protection after a collision. In the illustrated embodiment, the outer protective frame 140, 142 has an elliptical shape which provides sufficient rotation space for the rotor assemblies 72, 74 and minimizes overall length of the whole device.

In general, the cages 196 extend parallel the rotor rotational plane and are arranged along a first and a second side of the body 20. The frames can function as an intermediary component between the rotating rotor 42 and a retention mechanism (e.g., retention mechanism such as a user's hand). The cage 196 extend along first and second sides of the body 20 (e.g., along the top and bottom of the rotors), encapsulate the rotors (e.g., extend along all sides of the rotors), or be otherwise configured. The cages 196 may be formed integrally with other components of the rotor assembly 72, 74, or may be a comprised of one or more separate pieces which must be assembled to form the cage 196.

The frame arrangement 70 may be used with a multitude of different types of aerial systems 12. The frame arrangement 70 of the present invention may be used with aerial systems designed for, but not limited to, the following functions: selfie pictures and/or video, remote control aerial surveillance, autonomous flying robot(s), etc.

As shown, the body 20 forms a cavity within which are housed the power supply (in the form of a battery) 38 and a PC board on which sensors and other components of the system 10 or aerial system 12 may be mounted.

A propeller motor 108 may be mounted to the rotor assembly 72, 74. One of the propeller blades or rotors 42 is mounted to the propeller motor 108. Under control of the processing system 22, the rotor assembly base 112, propeller motor 108 and rotor 42 may be rotated along the rotational axis 104 by a servo motor 190, 192 (See FIG. 8).

As discussed above, the body 20 may form part of the frame assembly 70. In the illustrated embodiment, the frame assembly 70 includes the first and second rotor assemblies 72, 74 which include a cage 196 for housing a respective rotor 42. The cage 196 provides protection to, and from, the rotors 42, while allowing proper airflow. As discussed above, when not in use, the rotor assemblies 72, 74 may be pivoted about a respective hinge axis 120, 126 such that the aerial system 12 is in a closed or compact arrangement.

The servo motors 190, 192, under control of the processors 30, control the rotational position of the rotor assemblies 72, 74 relative to the body 20 to control direction of movement, pitch and roll of the aerial system 12. The rotor assemblies may be rotated in about the respective rotation axis 104 in two directions. As shown, the rotor assemblies 72, 74 may be rotated (in either direction) from a plane defined by the body 20 and the outer protective frame. The bearings 186 are provided between the rotor assembly 72, 74 and the respective outer protection frame to allow relative movement.

With reference to FIGS. 18A-20D, movement of the aerial system 12 may be achieved through controllable rotation of the propellers 42 by the rotor motors 108 and rotation of the rotary assemblies 72, 74 by the servo motors. For example, with reference to FIGS. 18A and 18B, the pitch of the aerial system 12 may be controlled in the direction of the respective arrow, through angling of the rotary assembly 72, 74 as shown.

Figure 18A:
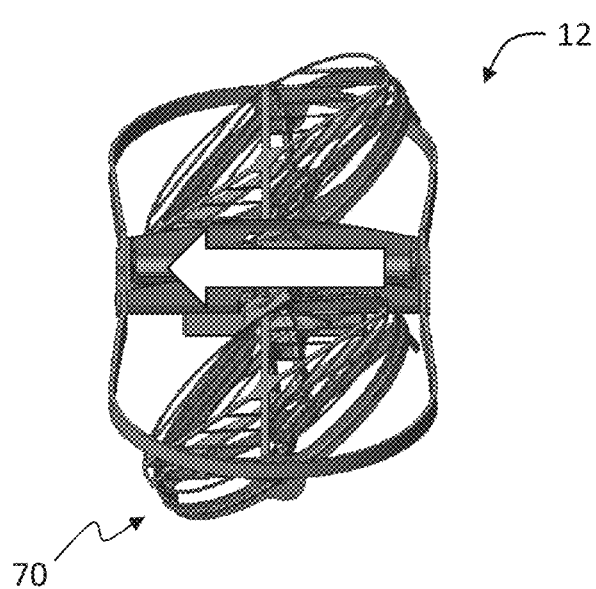
FIGS. 18A-20D are schematic representations of the frame assembly of an aerial system during different maneuvers, according to an embodiment of the present invention.
Figure 18B:
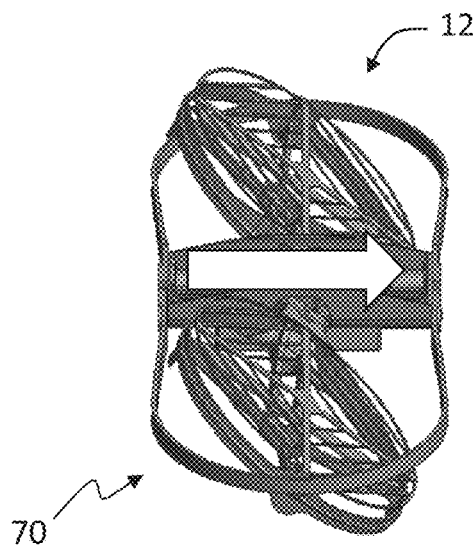
Figure 18C:
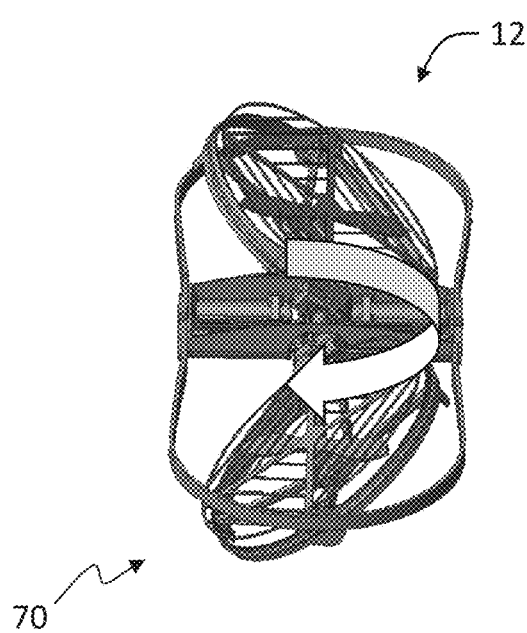
Figure 18D:
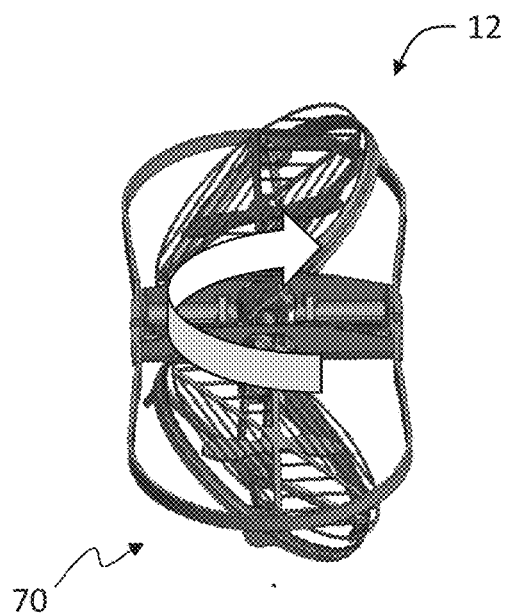

Likewise, with reference to FIGS. 18C and 18D the yaw of the aerial system 12 (in the direction of the arrows) may be controlled through angling of the rotary assemblies 72, 74 as shown.

Figure 18E:
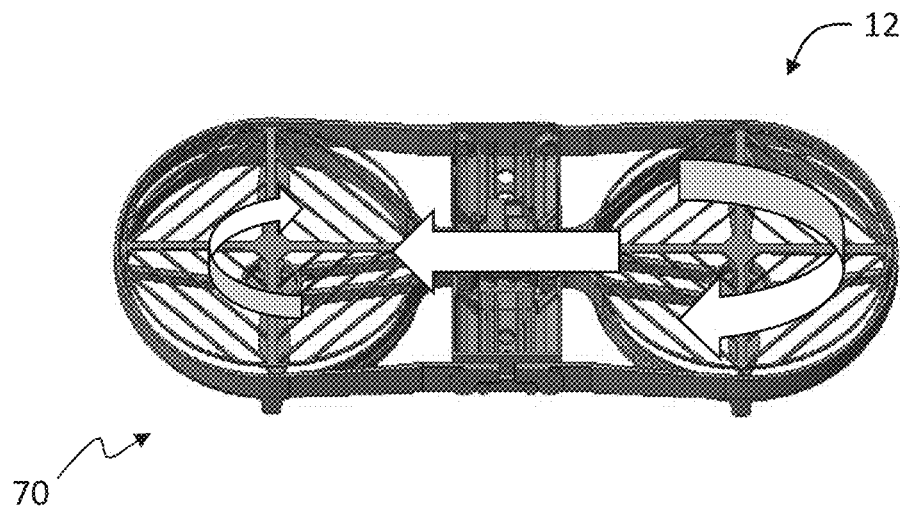
Figure 18F:
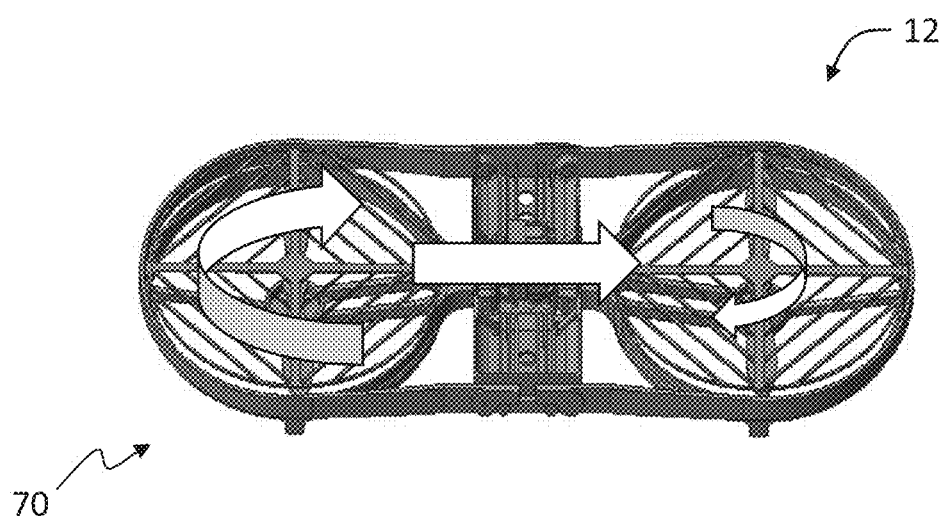

With specific reference to FIGS. 18E and 18F, the aerial system 12 may be controllably rolled (in the direction of the center arrows) through actuation of the rotor motors in opposite directions as shown.

Figure 20A:
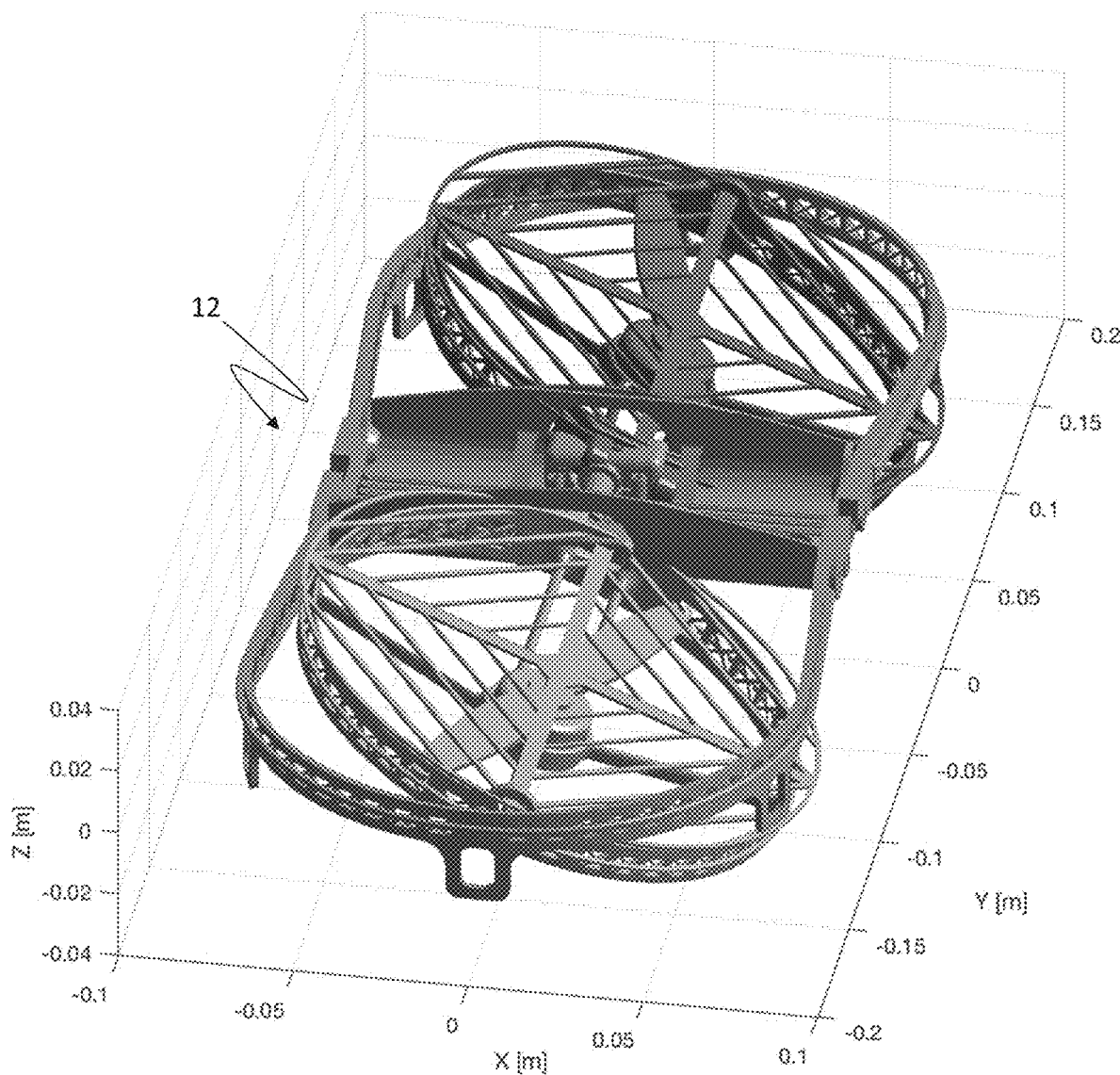
Figure 20B:
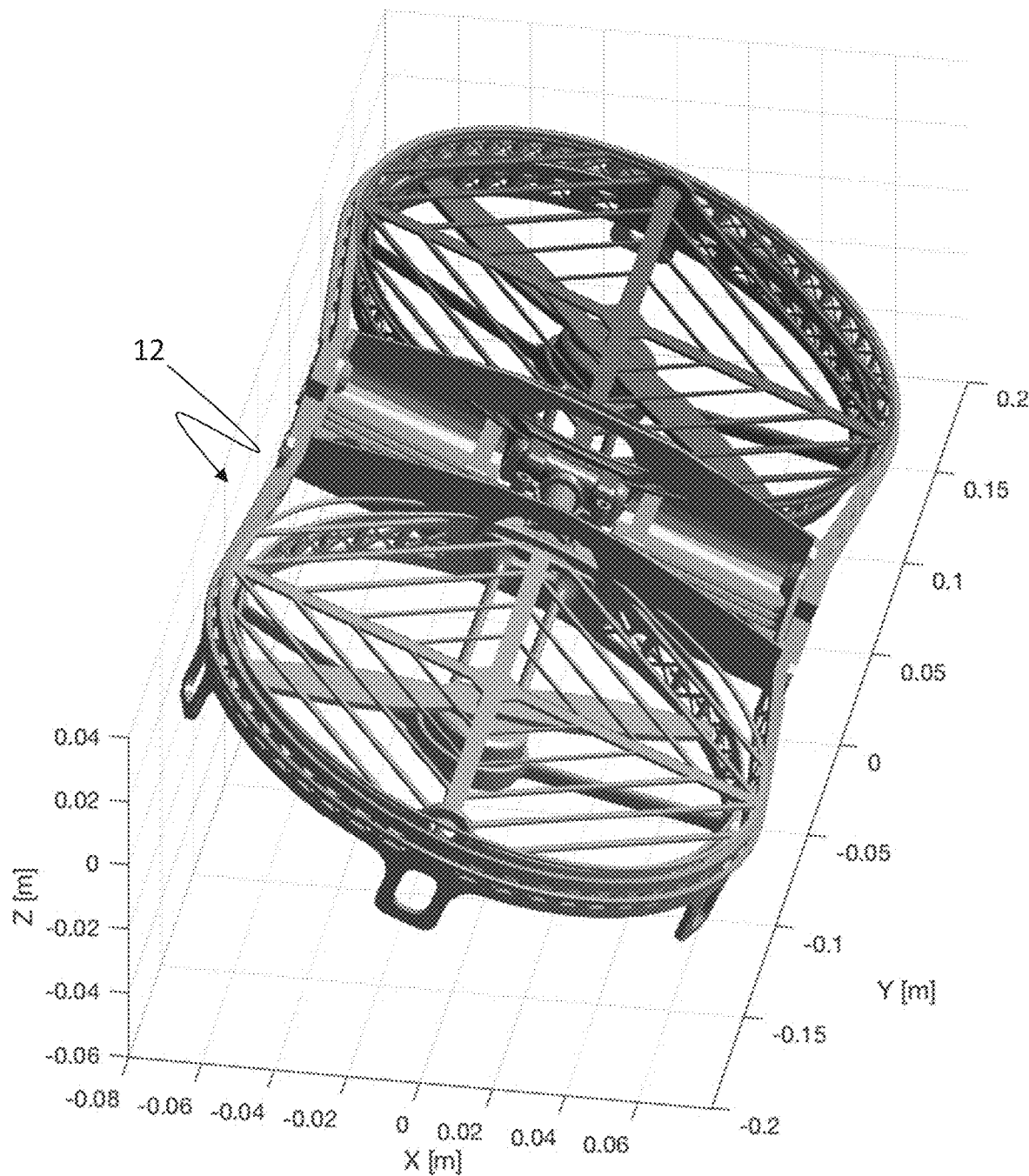
Figure 20C:
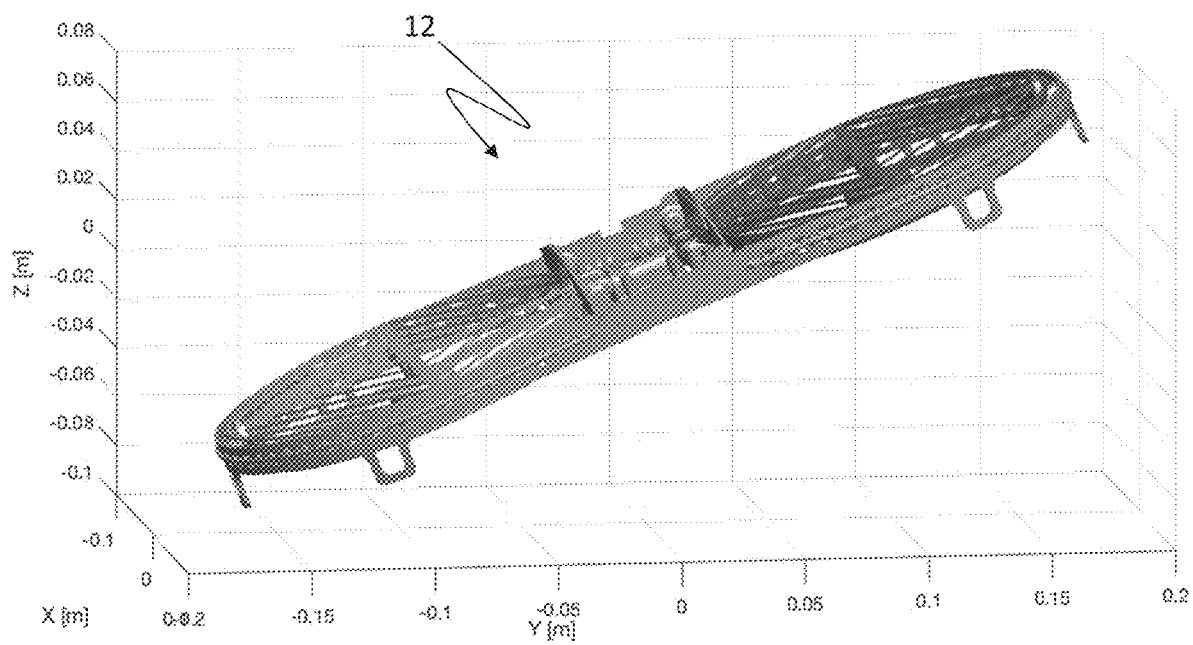
Figure 20D:
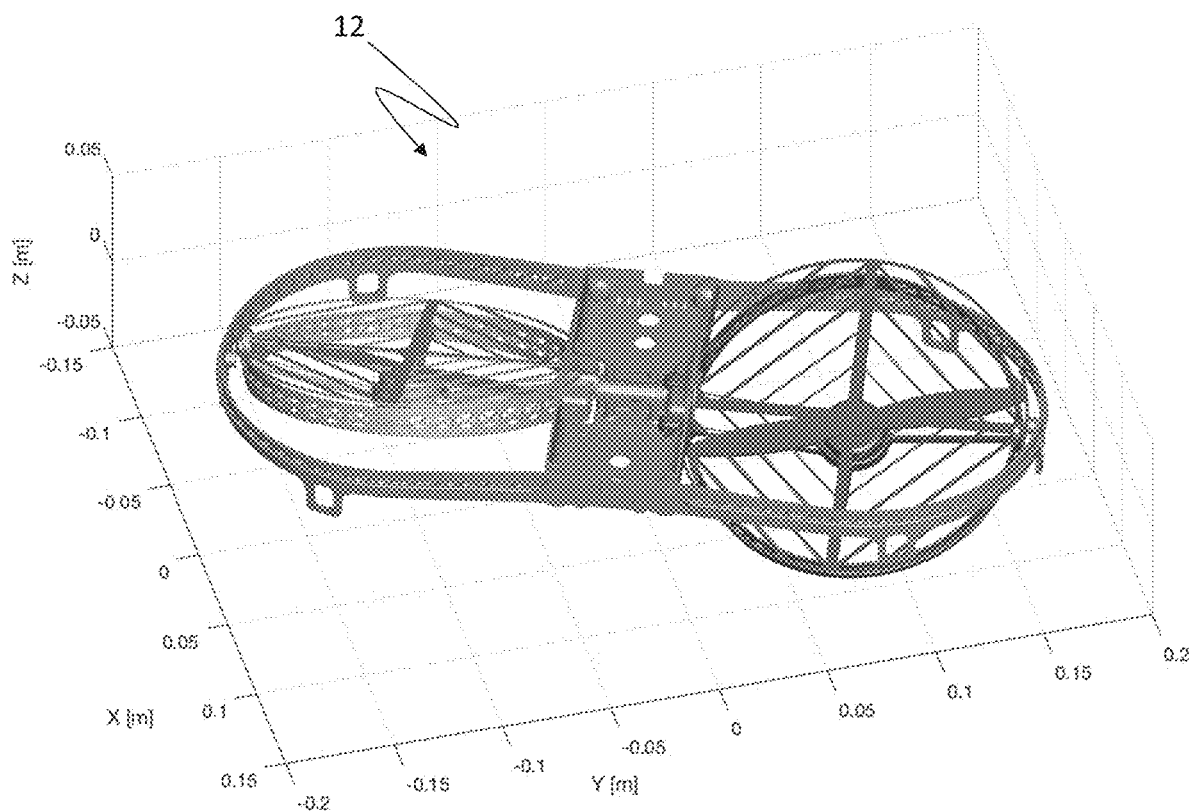

With reference to FIGS. 19-20D in one aspect of the present invention, flight of the aerial system 12 is controlled through four independent control variables:

The rotational speed of the propeller 42 in the first rotor assembly 72 ($W_2$);

The rotational speed of propeller 42 in the second rotor assembly 74 ($W_1$);

The angular position of the first rotor assembly 72 relative to the housing 20 along the rotational axis 104 ($\sigma 1$); and The angular position of the first rotor assembly 72 relative to the housing 20 along the rotational axis 104 ($\sigma 2$).

The rotational speed of the propellers 42 may be independently controlled via control of the respective rotor motors. The angular position of the rotor assemblies 72, 74 may be independently controlled via control of the respective servo motor. Generally, there are five types of maneuvers that can be accomplished independently for the aerial system 12 through control of the above-mentioned control variables: hovering at a fixed position; ascend/descend vertically; pitch/move forward; roll/move laterally; and yaw horizontally.

Each of the maneuvers requires the unique way to manipulate the control variables (see below.

Hovering at a fixed spatial position without aircraft orientation changes requires no net external force/torque. Hovering may be accomplished with $\sigma_1 = \sigma_2 = 0$ and $W_1 = W_2$, where the rotational speed of the propellers 42 equals a value that generates lift of half the weight of the aerial system 12. Small adjustments to the values of $\sigma_1$, $\sigma_2$, $W_1$, and $W_2$ may be governed by feedback control methods to maintain the aerial system 12 at such orientation and reject disturbances from wind. The effect of such small adjustments to each value are independent and are described below in the following descriptions of the other four maneuvers.

Ascending/descending in a vertical direction without other aerial system position/orientation changes requires generating net external forces in the vertical direction. In one embodiment of the present invention a method for ascending/descending vertically is described below, however, it should be noted that other methods may be used. Initially, the servo motors and the rotor motors are controlled to place the aerial system 12 in a hover condition, i.e., $\sigma_1 = \sigma_2 = 0$ and $W_1 = W_2$. Then, the rotational speed of the propellers 42 are increased simultaneously while keeping $W_1 = W_2$. This generates a vertical acceleration and forces the aerial system 12 to ascend. Once a desired vertical position/velocity is achieved, both $W_1$ and $W_2$ may be reduced to enter into the hover mode. To descend from a hover condition, the rotational speed of the propellers 42 may be decreased simultaneously while keeping $W_1 = W_2$.

Moving forward requires generating forward accelerations, which in turns requires net external forces that have components in the forward direction. In realistic applications, the forward accelerations will generally need to be maintained for a period of time. This requires the aerial system 12 to maintain the forward force component without changing the orientation of the aerial system 12. As a result, a desired aerial system orientation and angular position of the rotor assemblies 72, 74 must be achieved and maintained (see FIG. 20B). In one embodiment of the present invention a method for moving forward is described below, however, it should be noted that other methods may be used. Initially, the servo motors and the rotor motors are controlled to place the aerial system 12 in a hover condition, i.e., $\sigma_1 = \sigma_2 = 0$ and $W_1=W_2$. Then the rotor assemblies 72, 74 are rotated, i.e., increase $\sigma_1$ and $\sigma_2$, an equal amount. This generates a pitch moment about the aerial system's 12 center of gravity which forces the aerial system 12 to pitch forward (see FIG. 20A). When the desired pitch angle of the aerial system 12 is reached $\sigma_1$ and $\sigma_2$ are returned to zero, which yields/maintains the aerial system's 12 orientation as shown in FIG. 20B. $W_1=W_2$ are maintained and may be adjusted to maintain the vertical position pf the aerial system 12. Small adjustments to $\sigma_1$ and $\sigma_2$ may be made (using feedback control methods) to maintain the aerial system 12 at the desired orientation and reject disturbances from wind.

It should be noted that backward motion may be achieved by rotating the rotary assembles 72, 74 in the opposite direction, i.e., such that $\sigma_1$ and $\sigma_2$ are negative.

It should be noted that the above maneuvers may be combined to achieve more complex maneuvers, such as, but without being limited thereto: moving forward while ascending; moving forward while descending; moving backward while ascending; and moving backward while descending.

Moving laterally, i.e., causing the aerial system 12 to perform a roll maneuver, requires generating lateral accelerations, which in turns requires net external forces that have component in the lateral direction. In realistic applications, sometimes the lateral accelerations need to be maintained for a period of time, which requires the aerial system 12 to maintain the lateral force component without changing the orientation of the aerial system 12. As a result, a desired orientation and its servo angular position as shown in FIG. 20C needs to be achieved and maintained.

In one embodiment of the present invention a method for performing a roll toward the right is described below, however, it should be noted that other methods may be used. Initially, the servo motors and the rotor motors are controlled to place the aerial system 12 in a hover condition, i.e., $\sigma_1=\sigma_2=0$ and $W_1=W_2$. The rotational speed $W_1$ is increased while keeping $W_2$ generally constant. This generates a roll moment about center of gravity of the aerial system 12, which forces the aerial system to roll toward right. When the desired roll angle of the aerial system 12 is reached, $W_1$ and $W_2$ are set to an equal value such that the combined lift has a vertical component that equals the weight of the aerial system 12 (see FIG. 20C). Small adjustments of $W_1$ and $W_2$ that are governed by feedback control methods may be used to maintain the orientation of the aerial system and reject disturbances from wind. It should be noted that a roll in the opposite direction may be achieved by reversing that role of $W_1$ and $W_2$ in the above procedure.

Horizontal yaw requires generating net angular accelerations in the vertical direction, which in turn requires net external torque in the vertical direction. In realistic applications, yaw accelerations need to be achieved and maintained with no aircraft position changes or other aircraft orientation changes. As a result, a desired aircraft orientation and its servo angular position as shown in FIG. 20D needs to be achieved and maintained. In one embodiment of the present invention a method for performing a horizontal yaw maneuver is described below, however, it should be noted that other methods may be used. Initially, the servo motors and the rotor motors are controlled to place the aerial system 12 in a hover condition, i.e., $\sigma_1=\sigma_2=0$ and $W_1=W_2$. We then increase $\sigma_1$ and decrease $\sigma_2$ simultaneously with a same amount, generating a yaw moment about the center of gravity of the aerial system 12. This causes the aerial system 12 to perform a yaw maneuver. When the desired yaw angle of the aerial system 12 is reached, $\sigma_1$ and $\sigma_2$ are decreased to zero. The orientation of the aircraft at this point in shown FIG. 20C. The speed of the propellers 42 is maintained and may be adjusted to maintain the vertical position of the aerial system 12. Small adjustments of $\sigma_1$ and $\sigma_2$ are governed by feedback control methods to maintain the aerial system 12 at such orientation and reject disturbances from wind. It should be noted that a yaw in an opposite direction may be achieved by reversing that roles of $\sigma_1$ and $\sigma_2$ in the above procedure.

The application processing system 60 can include one or more application processors. The application processor can be a CPU, GPU, microprocessor, or any other suitable processing system. The application processing system 60 can implemented as part of, or separate from, the vision processing system 56, or be different from the vision processing system 56. The application processing system 60 may be connected to the visual processing system 56 by one or more interface bridges. The interface bridge can be a high-throughput and/or bandwidth connection, and can use a MIPI protocol (e.g., 2-input to 1-output camera aggregator bridges—expands number of cameras that can be connected to a vision processor), a LVDS protocol, a DisplayPort protocol, an HDMI protocol, or any other suitable protocol. Alternatively, or additionally, the interface bridge can be a low-throughout and/or bandwidth connection, and can use a SPI protocol, UART protocol, I2C protocol, SDIO protocol, or any other suitable protocol.

The system can optionally include an image signal processing unit (ISP) 62 that functions to pre-process the camera signals (e.g., images) before passing to vision processing system and/or application processing system. The ISP 62 can process the signals from all cameras, the signals from the camera subset, or signals any other suitable source. The ISP 62 can auto-white balance, correct field shading, rectify lens distortion (e.g., dewarp), crop, select a pixel subset, apply a Bayer transformation, demosaic, apply noise reduction, sharpen the image, or otherwise process the camera signals. For example, the ISP 62 can select the pixels associated with an overlapping physical region between two cameras from images of the respective streams (e.g., crop each image to only include pixels associated with the overlapping region shared between the cameras of a stereo-camera pair). The ISP 62 can be a system on a chip with multi-core processor architecture, be an ASIC, have ARM architecture, be part of the vision processing system, be part of the application processing system, or be any other suitable processing system.

The system can optionally include sensors 64 that function to sample signals indicative of system operation. The sensor output can be used to determine system kinematics, process the images (e.g., used in image stabilization), or otherwise used. The sensors 64 can be peripheral devices of the vision processing system 56, the application processing system 60, or of any other suitable processing system. The sensors 64 are preferably statically mounted to the housing but can alternatively be mounted to the host robot or to any other suitable system. Sensors 64 can include: orientation sensors (e.g., IMU, gyroscope, accelerometer, altimeter, magnetometer), acoustic sensors (e.g., microphones, transducers), optical sensors (e.g., cameras, ambient light sensors), touch sensors (e.g., force sensors, capacitive touch sensor, resistive touch sensor), location sensors (e.g., GPS system, beacon system, trilateration system), or any other suitable set of sensors.

The system can optionally include inputs (e.g., a keyboard, touchscreen, microphone, etc.), outputs (e.g., speakers, lights, screen, vibration mechanism, etc.), communication system (e.g., a WiFi module, BLE, cellular module, etc.), power storage (e.g., a battery), or any other suitable component.

The system is preferably used with a host robot that functions to traverse within a physical space. The host robot can additionally or alternatively receive remote control instructions and operate according to the remote control instructions. The host robot can additionally generate remote content or perform any other suitable functionality. The host robot can include one or more: communication modules, motive mechanisms, sensors, content-generation mechanisms, processing systems, reset mechanisms, or any other suitable set of components. The host robot can be a drone, vehicle, robot, security camera, or be any other suitable remote-controllable system. The motive mechanism can include a drivetrain, rotors, jets, treads, rotary joint, or any other suitable motive mechanism. The application processing system is preferably the host robot processing system, but can alternatively be connected to the host robot processing system or be otherwise related. In a specific example, the host robot includes an aerial system (e.g., drone) with a WiFi module, a camera, and the application processing system. The system can be mounted to the top of the host robot (e.g., as determined based on a gravity vector during typical operation), the bottom of the host robot, the front of the host robot, centered within the host robot, or otherwise mounted to the host robot. The system can be integrally formed with the host robot, removably coupled to the host robot, or otherwise attached to the host robot. One or more systems can be used with one or more host robots.

The power supply 38 provides a stable power supply for the aerial system 12 and the components therein. The power supply 38 may include protection functions in case of overvoltage, overcurrent and power failure, for example. The power supply 38 can be mounted on the body 20 or on the sensor housing.

Although omitted for conciseness, the illustrated embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

What is claimed is:

1. An aerial system, comprising:
a fuselage body including a pair of opposing sidewalls extending between a first endwall and an opposite second endwall along a longitudinal axis, the pair of opposing sidewalls being spaced apart a distance measured along a lateral axis that is perpendicular to the longitudinal axis; and
a lift assembly including:
a first rotor assembly extending outwardly from a first sidewall of the pair of opposing sidewalls;
a first positioning assembly coupled to the first rotor assembly, the first positioning assembly configured to rotate the first rotor assembly about a rotor assembly rotational axis that is perpendicular to the longitudinal axis, wherein the first positioning assembly includes a positioning shaft having a tapered outer surface;
a second rotor assembly extending outwardly from a second sidewall of the pair of opposing sidewalls; and
a second positioning assembly coupled to the second rotor assembly and to the fuselage body, the second positioning assembly configured to rotate the second rotor assembly about the rotor assembly rotational axis, the first positioning assembly being coupled to the second positioning assembly such that the first positioning assembly is rotatable about the rotor assembly rotational axis independent of the second rotor assembly, wherein the second positioning assembly includes a positioning sleeve having a tapered inner surface that defines a positioning cavity configured to receive the positioning shaft therein.

2. The aerial system of claim 1, wherein the lift assembly includes a first servo motor assembly coupled to the positioning shaft for rotating the first rotor assembly about the rotor assembly rotational axis, and a second servo motor assembly coupled to the positioning sleeve for rotating the second rotor assembly about the rotor assembly rotational axis independent of the first rotor assembly.

3. The aerial system of claim 1, wherein the first rotor assembly includes a first lift mechanism coupled to a first rotor support assembly, the first rotor support assembly being pivotably coupled to the first positioning assembly such that the first rotor assembly is pivotable about a first pivot axis that is parallel to the longitudinal axis; and
the second rotor assembly includes a second lift mechanism coupled to a second rotor support assembly, the second rotor support assembly being pivotably coupled to the second positioning assembly such that the second rotor assembly is pivotable about a second pivot axis that is parallel to the first pivot axis.

4. The aerial system of claim 3, wherein the lift assembly includes a first outer protective frame extending about a perimeter of the first lift mechanism and a second outer protective frame extending about a perimeter of the second lift mechanism;
wherein the first outer protective frame is pivotably coupled to the fuselage body and is pivotable about the first pivot axis; and
wherein the second outer protective frame is pivotably coupled to the fuselage body and is pivotable about the second pivot axis.

5. The aerial system of claim 3, wherein the lift assembly is positionable between a deployed position and a stowed position, the first lift mechanism is spaced a first distance from the second lift mechanism in the deployed position, and the first lift mechanism is spaced a second distance from the second lift mechanism in the stowed position that is less than the first distance.

6. The aerial system of claim 5, wherein the first lift mechanism includes a first propeller assembly that is rotatable about a first propeller rotational axis and the second lift mechanism includes a second propeller assembly that is rotatable about a second propeller rotational axis, the first propeller assembly is orientated coaxially with the second propeller assembly with the lift assembly in the stowed position.

7. The aerial system of claim 1, wherein the fuselage body includes an inner surface and a positioning groove defined along the inner surface, the positioning groove is configured to receive the positioning sleeve therein to facilitate coupling the positioning sleeve to the fuselage body.

8. The aerial system of claim 7, wherein the second positioning assembly includes at least one bearing coupled to an outer surface of the positioning sleeve to facilitate rotating the positioning sleeve with respect to the fuselage body, the at least one bearing being positioned within a recessed portion defined within the positioning groove.

9. The aerial system of claim 1, wherein the first positioning assembly includes a hinge assembly coupled to the positioning shaft, the first rotor assembly is pivotably coupled to the hinge assembly and is pivotable about a pivot axis that is parallel to the longitudinal axis.

10. The aerial system of claim 9, wherein the hinge assembly is positioned within a recessed portion defined along an outer surface of the fuselage body.

11. A lift assembly comprising:
a first rotor assembly and a second rotor assembly;
a first positioning assembly coupled to the first rotor assembly, the first positioning assembly configured to rotate the first rotor assembly about a rotor assembly rotational axis, wherein the first positioning assembly includes a positioning shaft having a tapered outer surface; and
a second positioning assembly coupled to the second rotor assembly, the second positioning assembly configured to rotate the second rotor assembly about the rotor assembly rotational axis, the first positioning assembly being coupled to the second positioning assembly such that the first positioning assembly is rotatable about the rotor assembly rotational axis independent of the second rotor assembly, wherein the second positioning assembly includes a positioning sleeve having a tapered inner surface that defines a positioning cavity configured to receive the positioning shaft therein.

12. The lift assembly of claim 11, wherein the lift assembly includes a first servo motor assembly coupled to the positioning shaft for rotating the first rotor assembly about the rotor assembly rotational axis, and a second servo motor assembly coupled to the positioning sleeve for rotating the second rotor assembly about the rotor assembly rotational axis independent of the first rotor assembly.

13. The lift assembly of claim 11, wherein the first positioning assembly includes a hinge assembly coupled to the positioning shaft, the first rotor assembly is pivotably coupled to the hinge assembly and is pivotable about a pivot axis that is parallel to the longitudinal axis, the hinge assembly is positioned within a recessed portion.

14. The lift assembly of claim 11, wherein the first rotor assembly includes a first lift mechanism coupled to a first rotor support assembly, the first rotor support assembly being pivotably coupled to the first positioning assembly such that the first rotor assembly is pivotable about a first pivot axis that is parallel to the longitudinal axis; and
the second rotor assembly includes a second lift mechanism coupled to a second rotor support assembly, the second rotor support assembly being pivotably coupled to the second positioning assembly such that the second rotor assembly is pivotable about a second pivot axis that is parallel to the first pivot axis.

15. The lift assembly of claim 14, wherein the lift assembly includes a first outer protective frame extending about a perimeter of the first lift mechanism and a second outer protective frame extending about a perimeter of the second lift mechanism;
wherein the first outer protective frame is pivotable about the first pivot axis; and
wherein the second outer protective frame is pivotable about the second pivot axis.

16. The lift assembly of claim 14, wherein the lift assembly is positionable between a deployed position and a stowed position, the first lift mechanism is spaced a first distance from the second lift mechanism in the deployed position, and the first lift mechanism is spaced a second distance from the second lift mechanism in the stowed position that is less than the first distance.

17. The lift assembly of claim 16, wherein the first lift mechanism includes a first propeller assembly that is rotatable about a first propeller rotational axis and the second lift mechanism includes a second propeller assembly that is rotatable about a second propeller rotational axis, the first propeller assembly is orientated coaxially with the second propeller assembly with the lift assembly in the stowed position.

* * * * *